(12) United States Patent
Lindberg et al.

(10) Patent No.: US 12,504,203 B2
(45) Date of Patent: *Dec. 23, 2025

(54) REVERSE-FLOW MAGMA-BASED GEOTHERMAL GENERATION

(71) Applicant: EnhancedGEO Holdings, LLC, St. Petersburg, FL (US)

(72) Inventors: Greg Lindberg, Thonotosassa, FL (US); Kimberly C. Conner, Wetumpka, AL (US)

(73) Assignee: EnhancedGEO Holdings, LLC, St. Petersburg, FL (US)

( * ) Notice: Subject to any disclaimer, the term of this patent is extended or adjusted under 35 U.S.C. 154(b) by 135 days.

This patent is subject to a terminal disclaimer.

(21) Appl. No.: 18/195,810

(22) Filed: May 10, 2023

(65) Prior Publication Data

US 2024/0271829 A1 Aug. 15, 2024

Related U.S. Application Data

(60) Provisional application No. 63/444,703, filed on Feb. 10, 2023.

(51) Int. Cl.
*F01D 15/10* (2006.01)
*E21B 7/06* (2006.01)
(Continued)

(52) U.S. Cl.
CPC .............. *F01D 15/10* (2013.01); *E21B 7/061* (2013.01); *E21B 43/14* (2013.01); *F03G 4/001* (2021.08); *F03G 4/029* (2021.08); *F03G 7/04* (2013.01)

(58) Field of Classification Search
CPC .................................. F03G 4/029; F03G 4/04
See application file for complete search history.

(56) References Cited

U.S. PATENT DOCUMENTS

| 227,908 A | 5/1880 | Magill |
|---|---|---|
| 1,043,129 A | 11/1912 | Murphy |

(Continued)

FOREIGN PATENT DOCUMENTS

| AU | 2018308861 A1 | 1/2020 |
|---|---|---|
| AU | 2017268378 B2 | 9/2021 |

(Continued)

OTHER PUBLICATIONS

Behzadi et al., Thermoeconomic analysis of a hybrid PVT solar system integrated with double effect absorption chiller for cooling/hydrogen production; Energy Equipment andSystems, vol. 6, Issue 4—Serial No. 4 (Dec. 2018), p. 413-427.

(Continued)

*Primary Examiner* — Giovanna Wright
(74) *Attorney, Agent, or Firm* — Stephen Y. Liu; Carstens, Allen & Gourley, LLP

(57) ABSTRACT

A geothermal system obtains heated heat transfer fluid via heat transfer with an underground reservoir of magma. The geothermal system includes a wellbore extending between a surface and into the underground reservoir of magma. A fluid pump provides a flow of heat transfer fluid toward the underground reservoir of magma. A fluid conduit extends from the surface toward a terminal end of the wellbore and allows flow of heated heat transfer fluid from a portion of the wellbore that extends into the underground reservoir of magma toward the surface.

18 Claims, 11 Drawing Sheets

(51) Int. Cl.
  *E21B 43/14* (2006.01)
  *F03G 4/00* (2006.01)
  *F03G 7/04* (2006.01)

(56) References Cited

U.S. PATENT DOCUMENTS

| | | | |
|---|---|---|---|
| 1,382,255 A | 6/1921 | Thomson et al. |
| 1,853,351 A | 4/1932 | Hayes |
| 1,882,314 A | 10/1932 | Burt |
| 2,299,548 A | 10/1942 | Maier |
| 2,618,342 A | 11/1952 | Meyer |
| 2,756,139 A | 7/1956 | Brooks et al. |
| 2,918,259 A | 12/1959 | Bus, Sr. |
| 2,929,612 A | 3/1960 | Bus, Sr. |
| 3,061,336 A | 10/1962 | Waggener |
| 3,150,962 A | 9/1964 | Pearson |
| 3,280,923 A | 10/1966 | Muench |
| 3,398,794 A | 8/1968 | Fox, Jr. |
| 3,459,953 A | 8/1969 | Brauser et al. |
| 3,498,381 A | 3/1970 | Earlougher, Jr. |
| 3,508,412 A | 4/1970 | Yearout |
| 3,606,173 A | 9/1971 | Rowland |
| 3,613,806 A | 10/1971 | Malott |
| 3,757,516 A | 9/1973 | Mc |
| 3,765,477 A | 10/1973 | Van |
| 3,864,208 A | 2/1975 | Van |
| 3,950,949 A | 4/1976 | Martin et al. |
| 3,957,108 A | 5/1976 | Huisen |
| 3,967,675 A | 7/1976 | Georgii |
| 4,043,129 A | 8/1977 | McCabe et al. |
| 4,047,093 A | 9/1977 | Levoy |
| 4,054,176 A | 10/1977 | Huisen |
| 4,057,108 A | 11/1977 | Broussard |
| 4,116,285 A | 9/1978 | Guerber |
| 4,140,184 A | 2/1979 | Bechtold et al. |
| 4,171,019 A | 10/1979 | Cole |
| 4,286,651 A | 9/1981 | Steiger et al. |
| 4,439,213 A | 3/1984 | Frey et al. |
| 4,492,083 A | 1/1985 | McCabe et al. |
| 4,511,461 A | 4/1985 | Kruyer |
| 4,642,987 A | 2/1987 | Csorba et al. |
| 4,665,705 A | 5/1987 | Bonham, Jr. |
| 4,776,169 A | 10/1988 | Coles, Jr. |
| 4,929,348 A | 5/1990 | Rice |
| 4,945,947 A | 8/1990 | Westra et al. |
| 4,999,097 A | 3/1991 | Sadoway |
| 5,094,746 A | 3/1992 | Bush |
| 5,143,150 A | 9/1992 | Johnston |
| 5,490,398 A | 2/1996 | Cline |
| 5,513,573 A | 5/1996 | Sutton |
| 5,515,679 A | 5/1996 | Shulman |
| 5,661,977 A | 9/1997 | Shnell |
| 5,860,279 A | 1/1999 | Bronicki et al. |
| 5,911,684 A | 6/1999 | Shnell |
| 6,237,404 B1 | 5/2001 | Crary et al. |
| 6,708,494 B1 | 3/2004 | Hamann |
| 7,124,584 B1 | 10/2006 | Wetzel et al. |
| 8,011,450 B2 | 9/2011 | Krueger et al. |
| 8,012,318 B2 | 9/2011 | Marsden et al. |
| 8,047,285 B2 | 11/2011 | Smith |
| 8,201,409 B1 | 6/2012 | Zakiewicz |
| 8,524,787 B2 | 9/2013 | Ermolaev et al. |
| 8,701,432 B1 | 4/2014 | Olson |
| 8,734,546 B2 | 5/2014 | McAlister |
| 9,006,298 B2 | 4/2015 | Leviness et al. |
| 9,028,171 B1 | 5/2015 | Seldner |
| 9,108,858 B2 | 8/2015 | McDonald et al. |
| 9,150,423 B2 | 10/2015 | Hosono et al. |
| 9,181,931 B2 | 11/2015 | McBay |
| 9,182,149 B2 | 11/2015 | Gilaberte et al. |
| 9,298,756 B1 | 3/2016 | Johnson |
| 9,359,271 B2 | 6/2016 | Leviness et al. |
| 9,388,797 B2 | 7/2016 | Bronicki |
| 9,541,309 B2 | 1/2017 | Colwell |
| 9,574,551 B2 | 2/2017 | Parrella et al. |
| 9,650,313 B2 | 5/2017 | Tippet et al. |
| 9,738,835 B2 | 8/2017 | Schrauwen |
| 9,765,605 B2 | 9/2017 | Williamson et al. |
| 10,017,395 B2 | 7/2018 | Kageyama et al. |
| 10,018,026 B2 | 7/2018 | McBay |
| 10,058,848 B2 | 8/2018 | Lipiec et al. |
| 10,131,545 B2 | 11/2018 | Sekine et al. |
| 10,173,202 B2 | 1/2019 | Hosono et al. |
| 10,203,162 B2 | 2/2019 | Yokomine et al. |
| 10,208,253 B2 | 2/2019 | McNamara et al. |
| 10,279,306 B2 | 5/2019 | Gebald et al. |
| 10,322,940 B2 | 6/2019 | Hosono et al. |
| 10,330,348 B2 | 6/2019 | McBay |
| 10,344,233 B2 | 7/2019 | Lucas et al. |
| 10,358,604 B2 | 7/2019 | Harris et al. |
| 10,710,049 B2 | 7/2020 | Mikhajlov et al. |
| 10,745,625 B2 | 8/2020 | Dogterom et al. |
| 10,759,668 B2 | 9/2020 | Hosono et al. |
| 10,787,894 B2 | 9/2020 | McBay |
| 10,792,645 B2 | 10/2020 | Hosono et al. |
| 10,914,293 B2 | 2/2021 | McBay |
| 10,954,924 B2 | 3/2021 | Moncarz et al. |
| 10,974,969 B2 | 4/2021 | Hu et al. |
| 11,131,484 B2 | 9/2021 | McBay |
| 11,235,310 B2 | 2/2022 | Hosono et al. |
| 11,286,169 B2 | 3/2022 | Beach et al. |
| 11,325,105 B2 | 5/2022 | Beach et al. |
| 11,584,888 B2 | 2/2023 | Mleczko et al. |
| 11,841,172 B2 | 12/2023 | Lindberg et al. |
| 11,852,383 B2 | 12/2023 | Lindberg et al. |
| 11,897,828 B1 | 2/2024 | Lindberg et al. |
| 11,905,797 B2 | 2/2024 | Lindberg et al. |
| 11,905,814 B1 | 2/2024 | Smith et al. |
| 11,913,679 B1 * | 2/2024 | Lindberg .............. F24T 50/00 |
| 11,918,967 B1 | 3/2024 | Lindberg et al. |
| 12,060,765 B1 | 8/2024 | Stone et al. |
| 12,209,776 B2 * | 1/2025 | Lindberg .............. F03G 7/04 |
| 2002/0104328 A1 | 8/2002 | DiFoggio |
| 2003/0005698 A1 | 1/2003 | Keller |
| 2003/0145592 A1 | 8/2003 | Stratford |
| 2004/0084182 A1 | 5/2004 | Edgar et al. |
| 2004/0131488 A1 | 7/2004 | Locher |
| 2004/0265158 A1 | 12/2004 | Boyapati et al. |
| 2006/0026961 A1 | 2/2006 | Bronicki |
| 2006/0065545 A1 | 3/2006 | Balan et al. |
| 2006/0180537 A1 | 8/2006 | Loftis et al. |
| 2006/0277917 A1 | 12/2006 | Hsu |
| 2007/0079617 A1 | 4/2007 | Farmer et al. |
| 2007/0151244 A1 | 7/2007 | Gurin |
| 2007/0289863 A1 | 12/2007 | Manousiouthakis et al. |
| 2008/0213157 A1 | 9/2008 | McGrady et al. |
| 2008/0216478 A1 | 9/2008 | Cherry |
| 2008/0283411 A1 | 11/2008 | Eastman et al. |
| 2009/0014336 A1 | 1/2009 | Olah et al. |
| 2009/0120288 A1 | 5/2009 | Lackner et al. |
| 2009/0226308 A1 | 9/2009 | Vandor |
| 2009/0227185 A1 | 9/2009 | Summers et al. |
| 2009/0321323 A1 | 12/2009 | Sharma et al. |
| 2010/0025260 A1 | 2/2010 | Naterer et al. |
| 2010/0045042 A1 | 2/2010 | Hinders et al. |
| 2010/0089645 A1 | 4/2010 | Trinh et al. |
| 2010/0269501 A1 | 10/2010 | Parrella |
| 2011/0167819 A1 | 7/2011 | Lakic |
| 2011/0232858 A1 | 9/2011 | Hara |
| 2012/0144829 A1 * | 6/2012 | Wiggs .............. F24T 10/30 |
| | | | 60/641.2 |
| 2012/0175077 A1 | 7/2012 | Lehmann et al. |
| 2012/0237440 A1 | 9/2012 | Kodama et al. |
| 2013/0101492 A1 | 4/2013 | McAlister |
| 2013/0153399 A1 | 6/2013 | McAlister |
| 2013/0232973 A1 | 9/2013 | McBay |
| 2013/0234444 A1 | 9/2013 | Rogers et al. |
| 2013/0283791 A1 | 10/2013 | Riley |
| 2013/0333383 A1 * | 12/2013 | Schwarck .............. F03G 4/074 |
| | | | 165/45 |
| 2013/0336879 A1 | 12/2013 | Yamazaki |
| 2014/0010742 A1 | 1/2014 | Hanna et al. |
| 2014/0026602 A1 | 1/2014 | Yabase et al. |
| 2014/0047836 A1 | 2/2014 | Parrella |

(56) References Cited

U.S. PATENT DOCUMENTS

| | | |
|---|---|---|
| 2014/0205519 A1 | 7/2014 | Shaw et al. |
| 2014/0262137 A1 | 9/2014 | McBay |
| 2014/0284045 A1 | 9/2014 | McBay |
| 2014/0309936 A1 | 10/2014 | Abbassian et al. |
| 2015/0027721 A1 | 1/2015 | Shreider et al. |
| 2015/0033745 A1 | 2/2015 | Bastian, II et al. |
| 2015/0033793 A1 | 2/2015 | Griffiths |
| 2015/0114639 A1 | 4/2015 | Williamson et al. |
| 2015/0122453 A1 | 5/2015 | Colwell |
| 2015/0128931 A1 | 5/2015 | Joshi et al. |
| 2015/0174522 A1 | 6/2015 | Eisenberger et al. |
| 2015/0300327 A1 | 10/2015 | Sweatman et al. |
| 2015/0361833 A1 | 12/2015 | Hinders et al. |
| 2015/0368565 A1 | 12/2015 | Schrauwen |
| 2015/0377211 A1 | 12/2015 | Occhiello |
| 2016/0097376 A1 | 4/2016 | Wasyluk et al. |
| 2016/0115945 A1 | 4/2016 | Barsi et al. |
| 2016/0123116 A1 | 5/2016 | Randle et al. |
| 2016/0194767 A1 | 7/2016 | Mulder |
| 2016/0251953 A1 | 9/2016 | Samuel et al. |
| 2016/0312371 A1 | 10/2016 | Kamei et al. |
| 2016/0363350 A1 | 12/2016 | Tahara |
| 2017/0106331 A1 | 4/2017 | Aronu et al. |
| 2017/0113184 A1 | 4/2017 | Eisenberger |
| 2017/0253492 A1 | 9/2017 | Beach et al. |
| 2017/0260829 A1 | 9/2017 | Aadnøy |
| 2017/0268803 A1 | 9/2017 | Cauchy |
| 2018/0010049 A1 | 1/2018 | Tenore et al. |
| 2018/0016872 A1 | 1/2018 | Randle |
| 2018/0106138 A1 | 4/2018 | Randolph |
| 2018/0112916 A1 | 4/2018 | Jia |
| 2018/0155638 A1 | 6/2018 | Al-Ghamdi et al. |
| 2018/0224164 A1 | 8/2018 | Lakic |
| 2018/0224215 A1 | 8/2018 | Thiers et al. |
| 2019/0032446 A1 | 1/2019 | Gronning |
| 2019/0055930 A1 | 2/2019 | Muir et al. |
| 2019/0093017 A1 | 3/2019 | Zhu |
| 2019/0157074 A1 | 5/2019 | Delmas et al. |
| 2019/0178391 A1 | 6/2019 | Gottlieb et al. |
| 2019/0264978 A1 | 8/2019 | Van Amelsvoort et al. |
| 2019/0359894 A1 | 11/2019 | Heidel et al. |
| 2019/0372137 A1 | 12/2019 | Planque et al. |
| 2019/0390660 A1 | 12/2019 | McBay |
| 2020/0011151 A1 | 1/2020 | Toews et al. |
| 2020/0040267 A1 | 2/2020 | Willigenburg et al. |
| 2020/0072199 A1 | 3/2020 | Fontana et al. |
| 2020/0080771 A1 | 3/2020 | Cooper |
| 2020/0086273 A1 | 3/2020 | Medoff et al. |
| 2020/0131446 A1 | 4/2020 | Wohaibi et al. |
| 2020/0200438 A1 | 6/2020 | McBay |
| 2020/0231455 A1 | 7/2020 | Beach et al. |
| 2020/0325030 A1 | 10/2020 | Cussler et al. |
| 2020/0353518 A1 | 11/2020 | Chandran et al. |
| 2021/0025241 A1 | 1/2021 | Crichlow |
| 2021/0025265 A1 | 1/2021 | Randolph |
| 2021/0025623 A1 | 1/2021 | Holtzman |
| 2021/0087472 A1 | 3/2021 | Garcia-Perez et al. |
| 2021/0114005 A1 | 4/2021 | Tao et al. |
| 2021/0122656 A1 | 4/2021 | Willberg et al. |
| 2021/0172266 A1 | 6/2021 | Dietz et al. |
| 2021/0207670 A1 | 7/2021 | Qi et al. |
| 2021/0230391 A1 | 7/2021 | Parrott et al. |
| 2021/0262317 A1 | 8/2021 | Gravois |
| 2021/0270496 A1 | 9/2021 | Holtzman |
| 2021/0348489 A1 | 11/2021 | O'Malley et al. |
| 2021/0371990 A1 | 12/2021 | Amaya et al. |
| 2021/0387135 A1 | 12/2021 | Dubois et al. |
| 2021/0404439 A1 | 12/2021 | Kinsella |
| 2022/0049592 A1 | 2/2022 | McBay |
| 2022/0099367 A1 | 3/2022 | Krishnamurthy et al. |
| 2022/0128298 A1 | 4/2022 | Thomas et al. |
| 2022/0154978 A1 | 5/2022 | McBay |
| 2022/0290053 A1 | 9/2022 | Mleczko et al. |
| 2022/0306949 A1 | 9/2022 | Nierode et al. |
| 2023/0022441 A1 | 1/2023 | Deng et al. |
| 2023/0098572 A1 | 3/2023 | Klussmann et al. |
| 2023/0114197 A1 | 4/2023 | Hughes |
| 2023/0130169 A1 | 4/2023 | McIntyre |
| 2023/0203386 A1 | 6/2023 | Nierode et al. |
| 2023/0272946 A1 | 8/2023 | Lindberg et al. |
| 2023/0272947 A1 | 8/2023 | Lindberg et al. |
| 2023/0296086 A1 | 9/2023 | Lindberg et al. |
| 2023/0304705 A1 | 9/2023 | Lindberg et al. |
| 2023/0349265 A1 | 11/2023 | Lindberg et al. |
| 2024/0024815 A1 | 1/2024 | Rousselet et al. |
| 2024/0271489 A1 | 8/2024 | Lindberg et al. |
| 2024/0271543 A1* | 8/2024 | Lindberg ............. F03G 7/04 |
| 2024/0271828 A1* | 8/2024 | Lindberg ............. F01D 15/10 |
| 2024/0271829 A1 | 8/2024 | Lindberg et al. |
| 2024/0271832 A1* | 8/2024 | Lindberg ............. F24T 10/20 |
| 2024/0279825 A1 | 8/2024 | Krishnamurthy et al. |
| 2024/0295346 A1 | 9/2024 | Lindberg et al. |
| 2025/0059340 A1 | 2/2025 | Lindberg et al. |
| 2025/0059341 A1 | 2/2025 | Lindberg et al. |
| 2025/0059342 A1 | 2/2025 | Lindberg et al. |
| 2025/0059343 A1 | 2/2025 | Lindberg et al. |
| 2025/0122771 A1 | 4/2025 | Steele |
| 2025/0179890 A1 | 6/2025 | Witte et al. |
| 2025/0230371 A1 | 7/2025 | Conner et al. |

FOREIGN PATENT DOCUMENTS

| | | |
|---|---|---|
| AU | 2016398360 B2 | 1/2022 |
| CA | 2679905 A1 | 3/2011 |
| CN | 105148824 A | 12/2015 |
| CN | 106837176 A | 6/2017 |
| CN | 107326195 A | 11/2017 |
| CN | 107675211 A | 2/2018 |
| CN | 108952650 A | 12/2018 |
| CN | 112604697 A | 4/2021 |
| CN | 113494273 A | 10/2021 |
| CN | 113562692 A | 10/2021 |
| CN | 216741858 U | 6/2022 |
| EP | 0236640 A1 | 9/1987 |
| EP | 0326736 A2 | 8/1989 |
| EP | 2792010 B1 | 1/2018 |
| EP | 3472110 A1 | 4/2019 |
| EP | 3583321 A1 | 12/2019 |
| GB | 544112 A | 3/1942 |
| GB | 2592695 A | 9/2021 |
| GB | 2615913 A | 8/2023 |
| JP | h07286760 A | 10/1995 |
| JP | h10510892 B | 10/1998 |
| JP | 2011052621 A | 3/2011 |
| JP | 5502006 B2 | 10/2012 |
| JP | 2014202149 A | 10/2014 |
| JP | 2018200027 A | 12/2018 |
| JP | 2020067027 A | 4/2020 |
| NO | 345651 | 5/2021 |
| RU | 2406853 C2 | 12/2010 |
| RU | 2529769 C2 | 9/2014 |
| RU | 2686656 C1 | 4/2019 |
| WO | 2009116873 A1 | 9/2009 |
| WO | 2012079078 A2 | 6/2012 |
| WO | 2012037571 A3 | 7/2012 |
| WO | 2012106020 A1 | 8/2012 |
| WO | 2013025640 A2 | 2/2013 |
| WO | 2013120132 A1 | 8/2013 |
| WO | 2013169242 A1 | 11/2013 |
| WO | 2015066764 A1 | 5/2015 |
| WO | 2016204287 A1 | 12/2016 |
| WO | 2019161114 A1 | 8/2019 |
| WO | 2020150245 A1 | 7/2020 |
| WO | 2020160500 A1 | 8/2020 |
| WO | 2021180893 A1 | 9/2021 |
| WO | 2021188547 A1 | 9/2021 |
| WO | 2022043947 A1 | 3/2022 |
| WO | 2021257944 A9 | 4/2022 |
| WO | 2022123626 A1 | 6/2022 |
| WO | 2022170390 A1 | 8/2022 |

(56) References Cited

FOREIGN PATENT DOCUMENTS

| WO | 2022211643 A1 | 10/2022 |
| WO | 2023062279 A1 | 4/2023 |

OTHER PUBLICATIONS

Dunn, "Energy Extraction from Crustal Magma Bodies"; Sandia National Laboratories (1982), p. 1-18; URL: https://osti.gov/servlets/purl/6740186-LNgWIn/.

El Tayeb, "Fabrication, Characterisation and Analysis of Ceria Thin Films and Patterned Nanostructured Deposits for Enhanced Solar-Driven Thermochemical Conversion"; Thesissubmitted in partial fulfillment of the requirement for the degree of doctor of philosophy, Dublin City University (Nov. 2016), p. 1-175.

Boehm, R.F. et al, Modelling of a Magma Energy Geothermal Power Plant, presented at ASME Winter Annual Meeting, Boston MA, Dec. 1987, SAND-87-0564C, DE88 003793, 11 pages.

Colp, John L., Final Report—Magma Energy Research Project, Sandia Report, Sand82-2377, Unlimited Release, UC-66, prepared by Sandia National Laboratories under contrace DE-AC04-76DP00789, Printed Oct. 1982, 42 pages.

Melting Points of Rocks and Minerals (Year: 2020); https://www.hsc.edu.kw/student/materials/Physics/website/hyperphysicsmodified/hbase/geophys/meltrock.html; downloaded Feb. 3, 2025.

\* cited by examiner

REVERSE-FLOW MAGMA-BASED GEOTHERMAL GENERATION

CROSS-REFERENCE TO RELATED APPLICATIONS

This application claims priority to U.S. Provisional Patent Application No. 63/444,703, filed Feb. 10, 2023, which is hereby incorporated herein by reference in its entirety.

TECHNICAL FIELD

The present disclosure relates generally to geothermal systems and related methods, and more particularly to geothermal systems and methods using energy from underground magma reservoirs.

BACKGROUND

Solar power and wind power are commonly available sources of renewable energy, but both can be unreliable and have relatively low power densities. In contrast, geothermal energy can potentially provide a higher power density and can operate in any weather condition or during any time of day. However, there exists a lack of tools for effectively harnessing geothermal energy.

SUMMARY

Most existing geothermal energy systems are used for heating applications, such as to heat a home or other space. Where geothermal has been attempted for energy production or other higher temperature applications, previous geothermal systems have required significant expenditure of finances, labor, and equipment, rendering them impractical for commercial development. Most previous geothermal systems tap into low temperature resources of less than 194° F. that are relatively near the surface, significantly limiting applications and locations where previous geothermal systems can be deployed. In addition to other disadvantages of previous geothermal technology, the inability of previous technology to efficiently and reliably access high-temperature underground geothermal resources renders conventional geothermal systems technologically and financially impractical.

As used herein, "magma" refers to extremely hot liquid and semi-liquid rock under the Earth's surface. Magma is formed from molten or semi-molten rock mixture found typically between 1 km to 10 km under the surface of the Earth. As used herein, a "rock plug" refers to a section or volume of rock formed from hardened magma. As used herein, "lava" refers to molten or partially molten rock that has been expelled from the interior of the earth onto its surface extremely hot liquid and semi-liquid rock under the Earth's surface.

As used herein, "borehole" refers to a hole that is drilled to aid in the exploration and recovery of natural resources, including oil, gas, water, or heat from below the surface of the Earth. As used herein, a "wellbore" refers to a "borehole" either alone or in combination with one or more other components disposed within or in connection with the borehole in order to perform exploration and/or recovery processes.

As used herein, "fluid conduit" refers to any structure, such as a pipe, tube, or the like, used to transport fluids. As used herein "drill stem" refers to a drill pipe formed from tool joints, a swivel, a bit, a drill string, drill collars, drives, subs, a top drive, shock absorbers, reamers and any other related equipment used during the drilling process.

As used herein, "heat transfer fluid" refers to a fluid, e.g., a gas or liquid, that takes part in heat transfer by serving as an intermediary in cooling on one side of a process, transporting and storing thermal energy, and heating on another side of a process. Heat transfer fluids are used in processes requiring heating or cooling. As used herein, a "cooling fluid" is a heat transfer fluid used to provide cooling to an area, such as within a borehole.

As used herein "superheated steam" refers to steam at a temperature higher than its vaporization point at the absolute pressure where the temperature is measured.

This disclosure recognizes the previously unidentified and unmet need for a geothermal system that harnesses a geothermal resource with a sufficiently high temperature that can provide a sufficiently high temperature for desired processes. For example, an underground geothermal reservoir, such as a magma reservoir, may facilitate the generation of high-temperature, high-pressure steam, while avoiding problems and limitations associated with previous geothermal technology. The geothermal systems of this disclosure generally include a wellbore that extends from a surface into the underground thermal reservoir. The wellbore may have a variety of features and improvements that are described in more detail below. For example, the wellbore may include a fluid conduit that facilitates improved heat transfer by allowing heat transfer fluid to be in direct or near direct thermal contact with the thermal reservoir and allowing the heated heat transfer fluid to be returned to the surface with fewer thermal losses than are experienced with previous technology. For example, a heat transfer fluid, such as water, can be heated (e.g., converted to steam) and returned to the surface for use in any appropriate high-temperature, high-pressure thermal process, such as energy production, a thermochemical reaction, or the like.

This disclosure also recognizes the previously unidentified and unmet need for a geothermal system that harnesses a geothermal resource with sufficiently high amounts of energy from magmatic activity such that the geothermal resource does not degrade significantly over time. This disclosure illustrates improved systems and method for capturing energy from magma reservoirs, dykes, sills, and other magmatic formations that are significantly higher in temperature than heat sources that are accessed using previous geothermal technologies and that can contain an order of magnitude higher energy density than the geothermal fluids that power previous geothermal technologies. Unlike previous geothermal technologies, certain embodiments of the systems and methods described herein may be resistant to degradation, such that the operating lifetimes of the disclosed systems and methods may be significantly increased over those of previous technologies. The present disclosure may significantly decrease energy production costs and/or reliance on non-renewable resources. In some cases, the present disclosure may facilitate the electrification of regions where access to reliable power is currently unavailable. The systems and methods of the present disclosure may aid in decreasing carbon emissions.

In some cases, the wellbore is cased, or lined by a thermally conductive material that prevents fluid flow between the inside of the wellbore and the surrounding environment, while still allowing heat transfer with the thermal reservoir. For example, the casing may be an alloy sheet with an annular cylinder shape that is attached to the internal surface of a borehole that is drilled to form the wellbore. In other cases, at least a portion of the wellbore that is below a ceiling of thermal reservoir (e.g., within a magma reservoir) does not have a casing. Instead, at the internal surface of the wellbore in this region is made up of magma that is quenched through the supply of an appropriate cooling fluid and/or through the regular or continuous supply of heat transfer fluid into the wellbore. In these partially cased wellbores, heat transfer between the heat transfer fluid introduced into the wellbore and the thermal reservoir is further improved, resulting in the ability to access higher temperatures to support a broader range of thermal processes, such as processes requiring higher energy densities.

In some cases, a pressurized chamber or other vessel is located within the wellbore. The chamber typically extends at least partially into the portion of the wellbore that is within the thermal reservoir. In this way, heat transfer fluid may be provided into the chamber and maintained in thermal contact with the thermal reservoir for a sufficient time and under appropriate conditions to achieve target characteristics, such as a target temperature and pressure. As such, the heat transfer fluid can be adjusted to target conditions to improve or optimize downstream thermal processes.

In some cases, the wellbore may be a directional wellbore in which a number of secondary boreholes may extend from a central or primary borehole that runs from the surface into the thermal reservoir. The network of boreholes formed from the primary and secondary boreholes facilitates improved thermal contact and heat transfer with the thermal reservoir. These directionally drilled wellbores can support high temperature processes at a single well, whereas previous technology may require tens or more of wells to achieve similar levels of power production.

In some cases, a molten salt may be employed as the heat transfer fluid that is provided into the wellbores of any of the geothermal systems described in this disclosure. The use of a molten salt may facilitate operations at higher temperatures than can be achieved using conventional heat transfer fluids and improve overall stability and reliability of geothermal operations.

Certain embodiments may include none, some, or all of the above technical advantages. One or more technical advantages may be readily apparent to one skilled in the art from figures, description, and claims included herein.

BRIEF DESCRIPTION OF THE FIGURES

For a more complete understanding of the present disclosure, reference is now made to the following description, taken in conjunction with the accompanying drawings and detailed description, in which like reference numerals represent like parts.

DETAILED DESCRIPTION

Embodiments of the present disclosure and its advantages will become apparent from the following detailed description when considered in conjunction with the accompanying figures. In the figures, each identical, or substantially similar component that is illustrated in various figures is represented by a single numeral or notation. For purposes of clarity, not every component is labeled in every figure, nor is every component of each embodiment shown where illustration is not necessary to allow those of ordinary skill in the art to understand the disclosure.

The present disclosure includes unexpected observations, which include the following: (1) magma reservoirs can be located at relatively shallow depths of about 2.1-2.5 km; (2) the top layer of a magma reservoir may have relatively few crystals with little or no mush zone; (3) rock near or around magma reservoirs is generally not ductile and can support fractures; (4) a magma reservoir does not decline in thermal output over at least a two-year period; (5) eruptions at drill sites into magma reservoirs are unlikely (e.g., eruptions have not happened at African and Icelandic drill sites in over 10,000 years and it is believed a Kilauea, Hawaii drill site has never erupted); and (6) drilling into magma reservoirs can be reasonably safe and rising magma can be quenched with water to form a drillable rock plug, as explained further below with respect to the new systems and methods of this disclosure.

Figure 1:
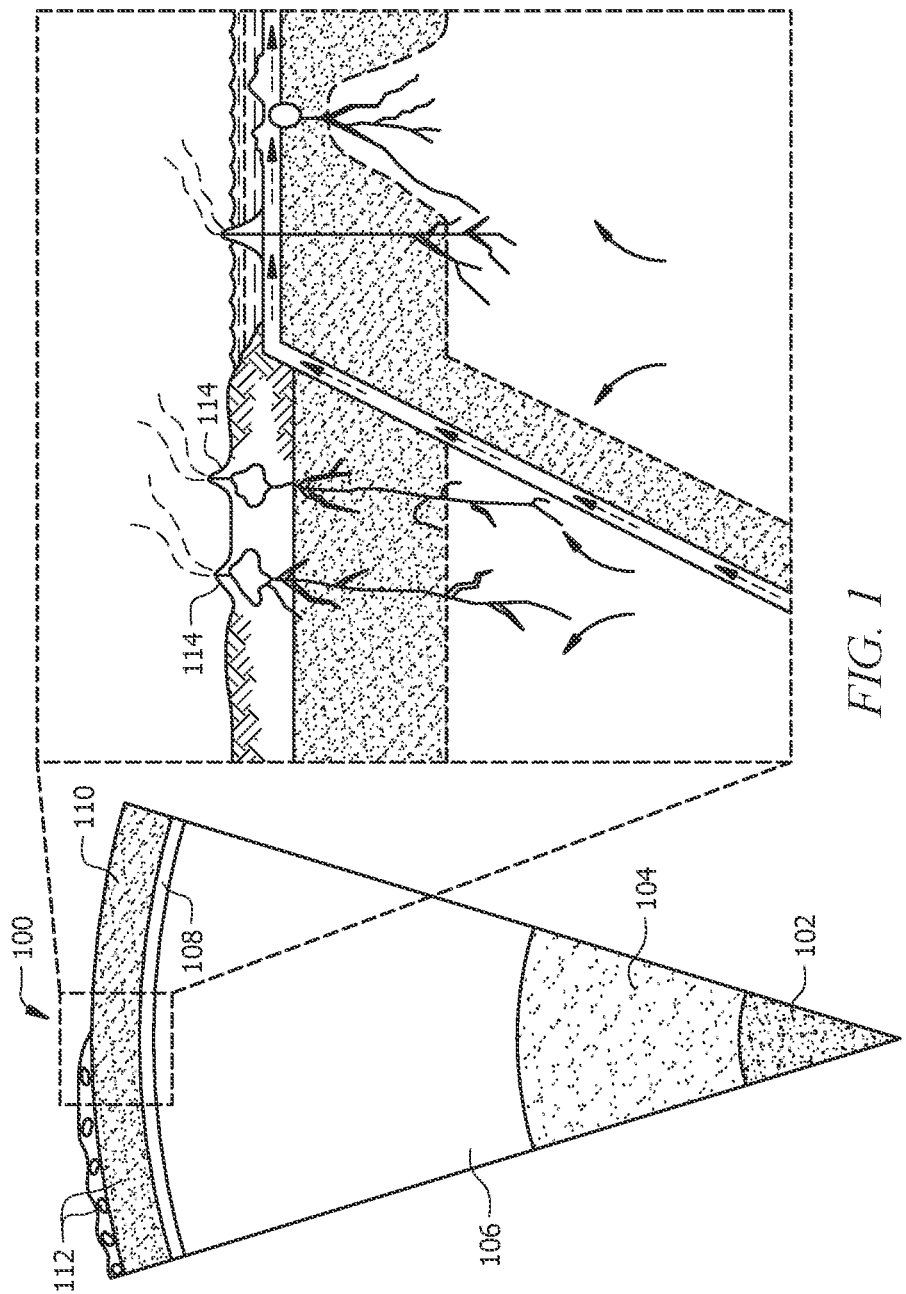
FIG. 1 is a diagram of underground regions in the Earth.

FIG. 1 is a partial cross-sectional diagram of the Earth depicting underground formations that can be tapped by geothermal systems of this disclosure (e.g., for generating geothermal power). The Earth is composed of an inner core 102, outer core 104, lower mantle 106, transition zone 108, upper mantle 110, and crust 112. There are places on the Earth where magma reaches the surface of the crust 112 forming volcanos 114. However, in most cases, magma approaches only within a few miles or less from the surface. This magma can heat ground water to temperatures sufficient for certain geothermal power production. However, for other applications, such as geothermal energy production, more direct heat transfer with the magma is desirable.

Figure 2:
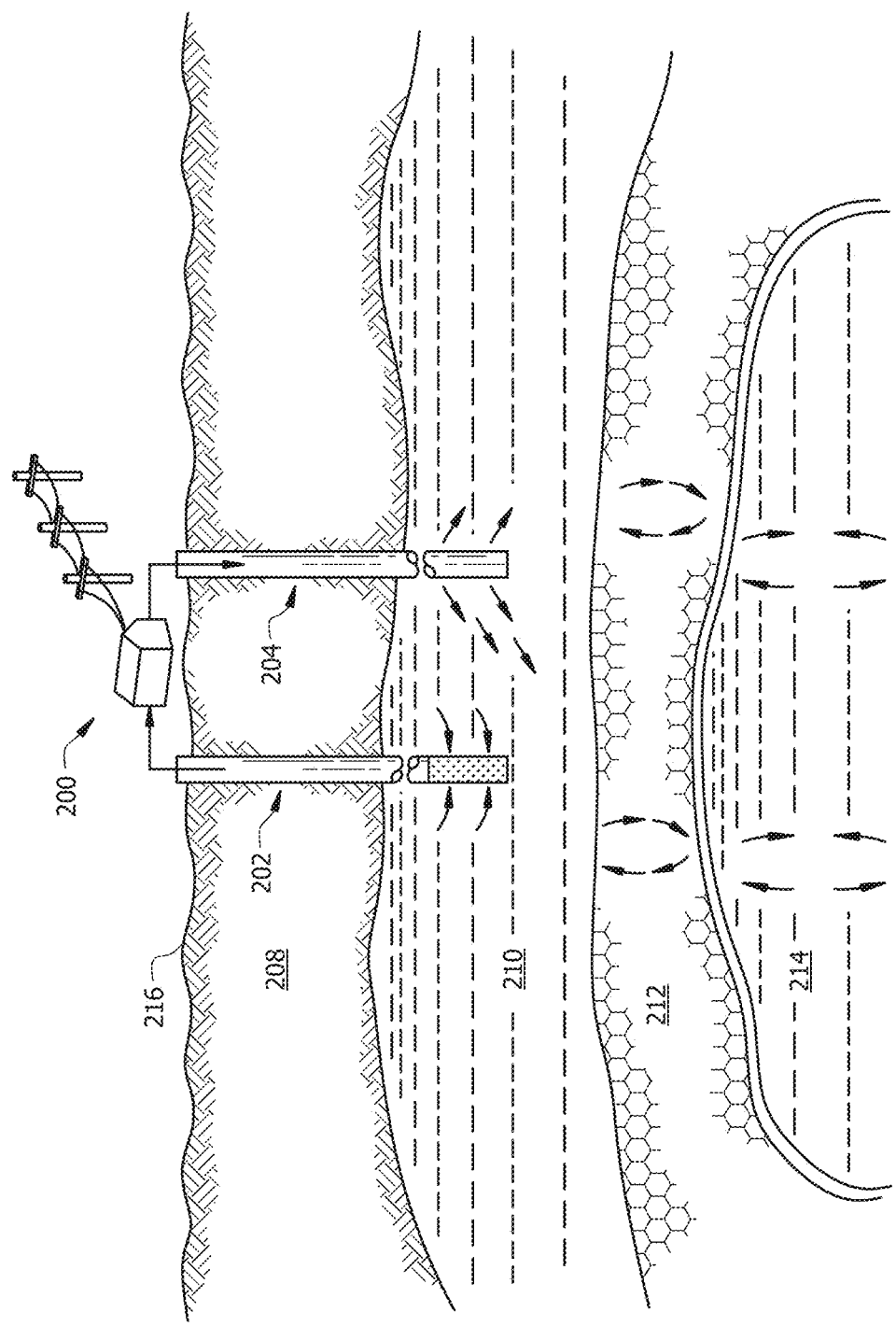
FIG. 2 is a diagram of a previous geothermal system.

FIG. 2 illustrates a conventional geothermal power generation system 200 that harnesses energy from heated ground water. The geothermal system 200 is a "flash-plant" that generates power from a high-temperature, high-pressure geothermal water extracted from a production well 202. The production well 202 is drilled through rock layer 208 and into the geothermal fluid layer 210 that serves as the source of geothermal water. The geothermal water is heated indirectly via heat transfer with intermediate layer 212, which is in turn heated by magma reservoir 214. Convective heat transfer (illustrated by the arrows indicating that hotter fluids rise to the upper portions of their respective layers before cooling and sinking, then rising again) may facilitate heat transfer between these layers. Geothermal water from layer 210 flows to the surface 216 and is used for geothermal power generation. The geothermal water (and possibly additional water or other fluids) is then injected back into layer 210 via injection well 210.

The configuration of conventional geothermal system 200 of FIG. 2 suffers from drawbacks and disadvantages, as recognized by this disclosure. For example, because geothermal water is a polyphase fluid (i.e., not pure water), the geothermal water flashes at various points along its path up to the surface 216, creating water hammer, which results in a large amount of noise and potential damage to system components. The geothermal water is also prone to cause scaling and corrosion of system components. Chemicals may be added to partially mitigate these issues, but this may result in considerable increases in operational costs and increased environmental impacts, since these chemicals are generally introduced into the environment via injection well 204.

Example Improved Geothermal System

Figure 3:
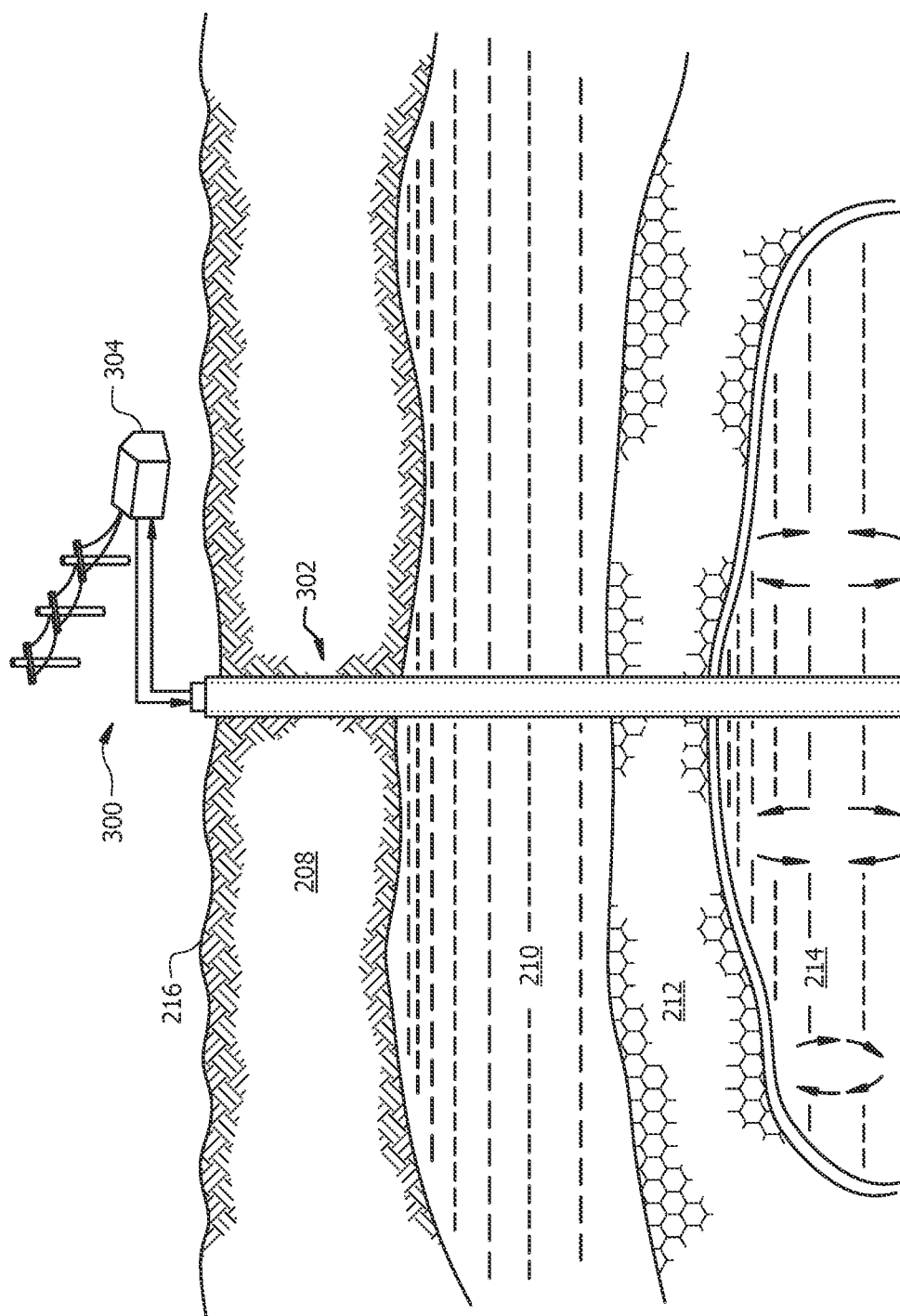
FIG. 3 is a diagram of an example improved geothermal system of this disclosure.

FIG. 3 illustrates an example magma-based geothermal system (or "magma system") 300 of this disclosure. The magma system 300 includes a wellbore 302 that extends from the surface 216 at least partially into the magma reservoir 214. The magma system 300 is a closed system in which a heat transfer fluid is provided down the wellbore 302 to be heated and returned to a thermal or heat-driven process system 304 (e.g., for power generation and/or any other thermal processes of interest). As such, geothermal water is not extracted from the Earth, resulting in significantly reduced risks associated with the conventional geothermal system 200 of FIG. 2, as described further below. Heated heat transfer fluid is provided to the heat-driven process system 304. The heat-driven process system 304 is generally any system that uses the heat transfer fluid to drive a process of interest. For example, the heat-driven process system 304 may be an electricity generation system. Further details of an example heat-driven process system 304 are provided with respect to FIG. 12 below and/or support thermal processes requiring higher temperatures/pressures than could be obtained using previous geothermal technology.

The magma system 300 provides technical advantages over previous geothermal systems, such as the conventional geothermal system 200 of FIG. 2. The magma system 300 can achieve higher temperatures and pressures for increased energy generation (and/or for more effectively driving other thermal processes). For example, because of the high energy density of magma in magma reservoir 214 (e.g., compared to that of geothermal water of layer 210), a single wellbore 302 can generally create the power of many wells of the conventional geothermal system 200 of FIG. 2. Furthermore, the magma system 300 has little or no risk of thermal shock-induced earthquakes, which might be attributed to the injection of cooler water into a hot geothermal zone, as is performed using the previous geothermal system 200 of FIG. 2. The heat transfer fluid is generally not released into the geothermal zone, resulting in a decreased environmental impact and decreased use of costly materials (e.g., chemical additives that are used and introduced to the environment in great quantities during some conventional geothermal operations). The magma system 300 may also have a simplified design and operation compared to those of previous systems. For instance, fewer components and reduced complexity may be needed at the heat-driven process system 304 because only clean heat transfer fluid (e.g., steam) reaches the surface 216. There is no need to separate out solids or other impurities that are common to geothermal water.

Figure 10:
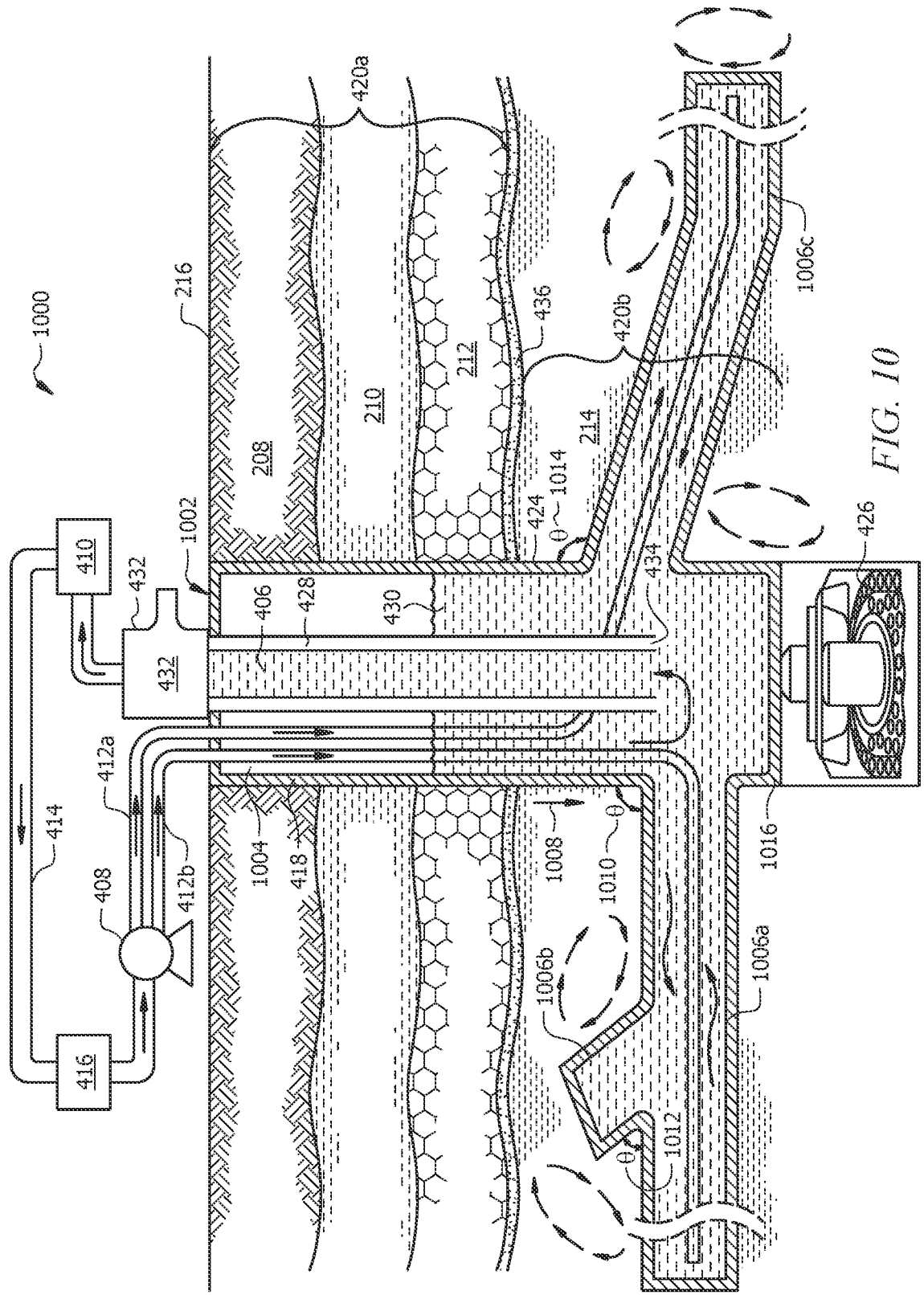
FIG. 10 is a diagram of an example improved geothermal system with a directional wellbore.
Figure 11:
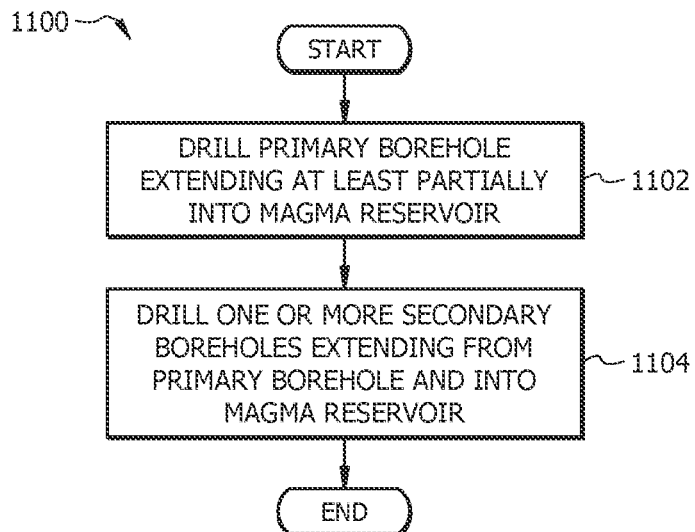
FIG. 11 is a flowchart of an example method for preparing the system of FIG. 10.

The example magma system 300 may include further components not illustrated in FIG. 3. Further details and examples of different configurations of magma systems and methods of their preparation and operation are described below with respect to FIGS. 4A-12. FIGS. 4A-6 describe an example magma system with a closed flow of heat transfer fluid in more detail. FIGS. 7A-9 describe another example magma system with a pressurized chamber located down the wellbore. FIGS. 10-11 describe another example magma system in which a directional wellbore includes secondary boreholes that extend from a primary borehole connecting the surface to the underground magma reservoir.

Example Magma System with Fully or Partially Cased Wellbore

Figure 4A:
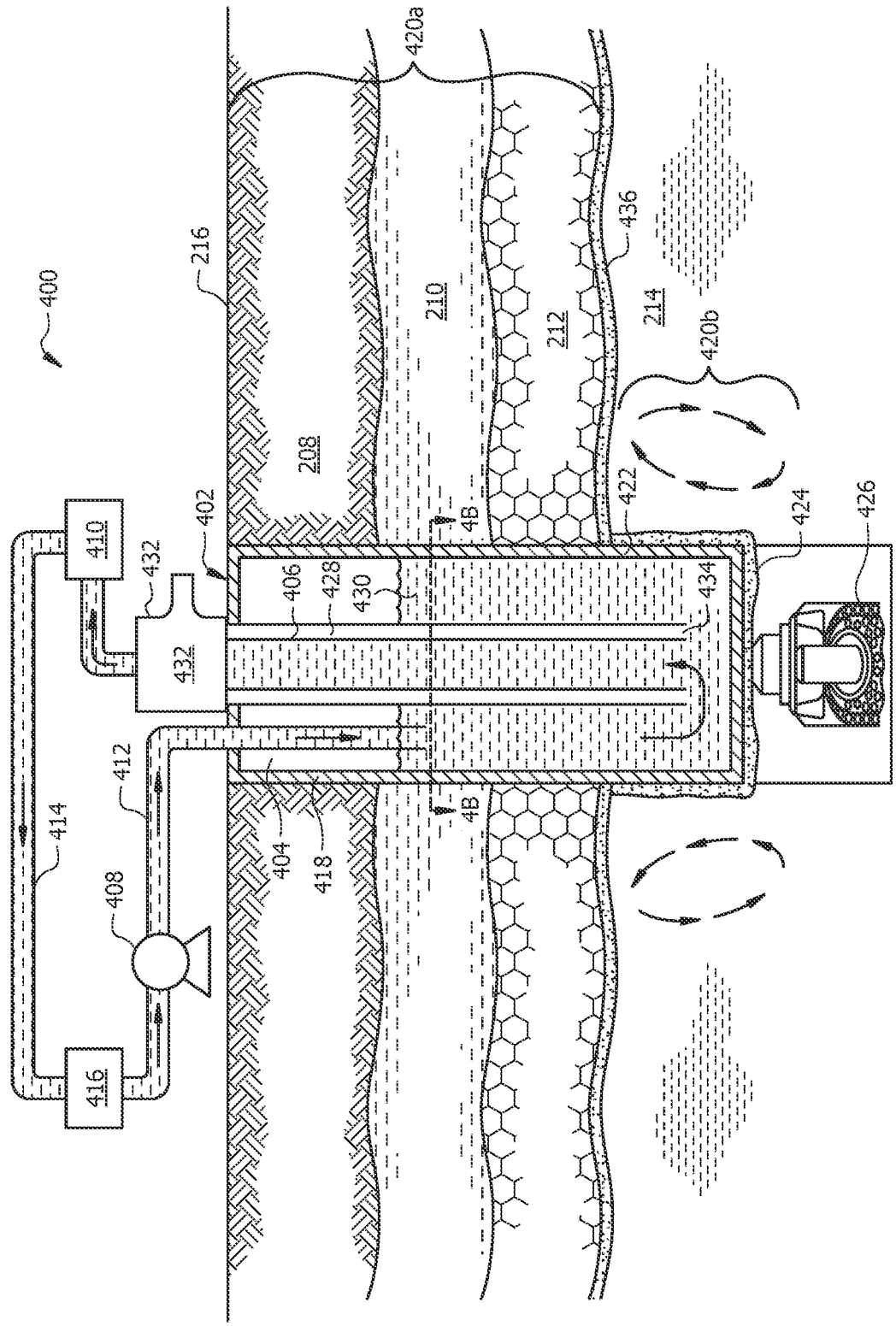
FIG. 4A is a diagram of an example improved geothermal system of this disclosure in more detail.

FIG. 4A shows an example magma system 400 in more detail. The magma system 400 facilitates the heating of a heat transfer fluid via heat transfer with an underground magma reservoir 214. The magma system 400 includes a wellbore 402 with a borehole 404 extending between a surface 216 and into an underground magma reservoir 214. A portion 420a of the borehole 404 is above the magma reservoir 214 and extends through layers 208, 210, and 212, as described above with respect to FIGS. 1 and 2. Another portion 420b of the borehole 404 extends at least partially into the magma reservoir 214. Heat transfer fluid 430 can be heated to sufficiently high temperatures within portion 420b of the borehole 404 to drive high-temperature processes (e.g., for generating steam for electricity generation, for driving thermochemical reactions, and the like, as described further below).

The magma system 400 has a closed loop for the flow of heat transfer fluid 430 into the wellbore 402, out of the wellbore 402, to a heat-driven process system 410 (see FIG. 12), and back to the wellbore 402. For example, a fluid pump 408 may provide a flow of heat transfer fluid 430 toward the underground magma reservoir 214. The fluid pump 408 is any appropriate fluid pump for driving a flow of the heat transfer fluid 430. The fluid pump 408 may pump heat transfer fluid 430 stored in a fluid source 416 (e.g., a tank or other canister of the heat transfer fluid 430). The heat transfer fluid 430 may be provided in the liquid phase. An inlet fluid conduit 412 facilitates flow of heat transfer fluid 430 into the wellbore 402. Fluid pump 408 may provide heat transfer fluid 430 at a flow rate to achieve a target temperature via heat transfer with the magma reservoir 214 (e.g., to achieve a target residence time in the portion 420b of the borehole 404 that extends into the magma reservoir 214, to achieve a target temperature and/or pressure of the heat transfer fluid 430 received at the surface 216, etc.). At any given time during operation, a portion of the wellbore 402 may be filled with heat transfer fluid 430 as illustrated in the example of FIG. 4A.

A fluid conduit 406 extends from the surface 216 to a terminal end 434 of the fluid conduit 406. The fluid conduit 406 may be attached to a wellhead 432 (described further below). The fluid conduit 406 generally facilitates flow of heated heat transfer fluid 430 from within the wellbore 402 back to the surface 216. The fluid conduit 406 may have an insulation layer 428 that aids in maintaining the heated heat transfer fluid 430 at an elevated temperature while it is transported back to the surface 216. For example, the insulation layer 428 may include a cement or other material with a relatively low thermal conductivity.

The heated heat transfer fluid 430 may be provided to the heat-driven process system 410. The heat-driven process system 410 may be the same as or similar to the heat-driven process system 304 of FIG. 3. For example, the heated heat transfer fluid 430 may be steam or superheated steam that is used to drive one or more turbines for electricity generation. Superheated steam is steam heated above its vaporization pressure at the current pressure. In some cases, the heat transfer fluid 430 may provide heat to one or more reaction vessels, a water distillation system, a heat-driven chilling apparatus (e.g., for operating condensers), a residential or industrial heating system, an agriculture system, an aquaculture system, or the like. Other examples of heat transfer fluid 430 and the operation of an example heat-driven process system 410 are described in greater detail below. Other examples of heat transfer fluids are described in U.S. patent application Ser. No. 18/099,499, filed Jan. 20, 2023, and titled "Geothermal Power from Superhot Geothermal Fluid and Magma Reservoirs"; U.S. patent application Ser. No. 18/099,509, filed Jan. 20, 2023, and titled "Geothermal Power from Superhot Geothermal Fluid and Magma Reservoirs"; U.S. patent application Ser. No. 18/099,514, filed Jan. 20, 2023, and titled "Geothermal Power from Superhot Geothermal Fluid and Magma Reservoirs"; U.S. patent application Ser. No. 18/099,518, filed Jan. 20, 2023, and titled "Geothermal Power from Superhot Geothermal Fluid and Magma Reservoirs"; U.S. patent application Ser. No. 18/105,674, filed Feb. 3, 2023, and titled "Wellbore for Extracting Heat from Magma Chambers"; U.S. patent application Ser. No. 18/116,693, filed Mar. 2, 2023, and titled "Geothermal systems and methods with an underground magma chamber"; and U.S. patent application Ser. No. 18/116,697, filed Mar. 2, 2023, and titled "Method and system for preparing a geothermal system with a magma chamber", the entirety of each of which is incorporated herein by reference.

A return conduit 414 facilitates the transport of heat transfer fluid 430 that is cooled by the heat-driven process system 410 back to the wellbore 402. For example, the return conduit 414 may allow flow of heat transfer fluid 430 back to the fluid source 416 (e.g., a fluid storage tank or the like), so that it can be pumped back into the wellbore 402 using fluid pump 408. Fluid conduit 412, 414 (and any other conduit whether labeled or not labeled in FIG. 4) may be any appropriate pipes and/or tubes for the flow of heat transfer fluid 430 between the interconnected components of the magma system 400.

The wellbore 402 includes borehole 404, which is a hole drilled from the surface 216 into the magma reservoir 214. The borehole 404 has an opening at the surface 216 and an end at a predetermined depth within the underground magma reservoir 214. One or more casings 418, 422 may be disposed within the borehole 404. A first casing 418 provides an internal surface within the top portion 420a of the wellbore 402. Casing 418 extends from the surface 216 until a ceiling 436 of the underground magma reservoir 214. The casing 418 may be any appropriate material for preventing or limiting transport of fluid from the wellbore 402 to the adjacent layers 208, 210, 212 of the Earth. For example, the casing 418 may be an alloy attached to the wall of the wellbore 402. The casing 418 may be attached with a cement or other appropriate material that has a relatively high thermal conductivity. Examples of hanging the casing 418 in the borehole 404 are described further below and with respect to FIG. 6. Other details and examples of hanging a casing within a wellbore are described in U.S. patent application Ser. No. 18/099,499, filed Jan. 20, 2023, and titled "Geothermal Power from Superhot Geothermal Fluid and Magma Reservoirs"; U.S. patent application Ser. No. 18/099,509, filed Jan. 20, 2023, and titled "Geothermal Power from Superhot Geothermal Fluid and Magma Reservoirs"; U.S. patent application Ser. No. 18/099,514, filed Jan. 20, 2023, and titled "Geothermal Power from Superhot Geothermal Fluid and Magma Reservoirs"; U.S. patent application Ser. No. 18/099,518, filed Jan. 20, 2023, and titled "Geothermal Power from Superhot Geothermal Fluid and Magma Reservoirs"; and U.S. patent application Ser. No. 18/105,674, filed Feb. 3, 2023, and titled "Wellbore for Extracting Heat from Magma Chambers".

In some cases, the casing 418 may extend at least partially into the lower portion 420b of the borehole 404 that extends into the magma reservoir 214. For example, a casing 422 may extend along the surface of the lower portion 420b of borehole 404. Like casing 418, the casing 422 prevents fluid transport into the adjacent magma reservoir 214, while also facilitating efficient heat transfer with magma in the magma reservoir 214. The optional casing 422 in the lower portion 420b of the borehole 404 may be the same as the casing 418 of the upper portion 420a or may be formed of a different material. In some cases, the casing 422 in the lower portion 420b of the borehole 404 may include materials (e.g., alloys, cements, etc.) with a higher heat resistance (e.g., with a higher melting temperature, degradation temperature, etc.). The surface of the casings 418, 422 may have a surface structure or texture (e.g., rifling) to reduce turbulent flow through the wellbore 402.

In some cases, the casings 418, 422 extend no more than partially (or not at all) into the underground magma reservoir 214. In such cases, a surface 424 of the borehole 404 within the underground reservoir is hardened magma. The hardened magma may be formed by quenching magma in the magma reservoir 214 with a cooling fluid. Examples of cooling fluids include water, brine, and any of the other heat transfer fluids described in this disclosure. The surface 424 may be a solidus rock layer, which may include igneous rock formed from hardened magma. The surface 424 may be igneous rock with no or negligible porosity such that heat transfer fluid 430 is not significantly transported into the magma reservoir 214. When surface 424 is exposed within the wellbore 402, the wellbore 402 is referred to as being "partially cased" because the casings 418, 422 do not cover all surfaces of the borehole 404. For example, the casing 418 may be disposed on or attached to the first borehole portion 420a, while the second borehole portion 420b does not have casing 422. Instead, a surface 424 of the second borehole portion 420b is formed of hardened magma (e.g., magma quenched by a cooling fluid). This disclosure recognizes that a partially cased wellbore may facilitate improved heat transfer between the heat transfer fluid 430 and the magma reservoir 214.

In some cases, the fluid conduit 406 is a drill stem (e.g., or an outer body of a drill stem) used to form the borehole 404. For example, a drill bit 426 used to drill the borehole 404 may be removed from the drill stem, such that the drill stem acts as the fluid conduit 406. In some cases, the drill bit 426 may be left attached to the drill stem/fluid conduit 406. The fluid conduit 406 may return heated heat transfer fluid from the wellbore 402 back to the surface 216 (as illustrated by the arrows in FIG. 4). The fluid conduit 406 has a hollow center for conveying a fluid (e.g., drilling fluid down the borehole 404 during drilling operations and heat transfer fluid up the borehole 404 during other operations).

Examples of methods of drilling a borehole 404 into a magma reservoir 214 are provided in U.S. patent application Ser. No. 18/099,499, filed Jan. 20, 2023, and titled "Geothermal Power from Superhot Geothermal Fluid and Magma Reservoirs"; U.S. patent application Ser. No. 18/099,509, filed Jan. 20, 2023, and titled "Geothermal Power from Superhot Geothermal Fluid and Magma Reservoirs"; U.S. patent application Ser. No. 18/099,514, filed Jan. 20, 2023, and titled "Geothermal Power from Superhot Geothermal Fluid and Magma Reservoirs"; U.S. patent application Ser. No. 18/099,518, filed Jan. 20, 2023, and titled "Geothermal Power from Superhot Geothermal Fluid and Magma Reservoirs"; U.S. patent application Ser. No. 18/105,674, filed Feb. 3, 2023, and titled "Wellbore for Extracting Heat from Magma Chambers"; U.S. patent application Ser. No. 18/116,693, filed Mar. 2, 2023, and titled "Geothermal systems and methods with an underground magma chamber"; and U.S. patent application Ser. No. 18/116,697, filed Mar. 2, 2023, and titled "Method and system for preparing a geothermal system with a magma chamber".

The fluid conduit 406 generally includes an attachment interface at the upper end, which is configured for connecting to a wellhead 432. The wellhead 432 includes fluid connections, valves, and the like for facilitating appropriate operation of the wellbore 402. For example, the wellhead 432 may include one or more valves to allow or restrict flow from the wellbore 402 towards the heat-driven process system 410. The wellhead 432 may include a relief valve for venting heat transfer fluid 430 if an excessive pressure is reached.

Figure 4B:
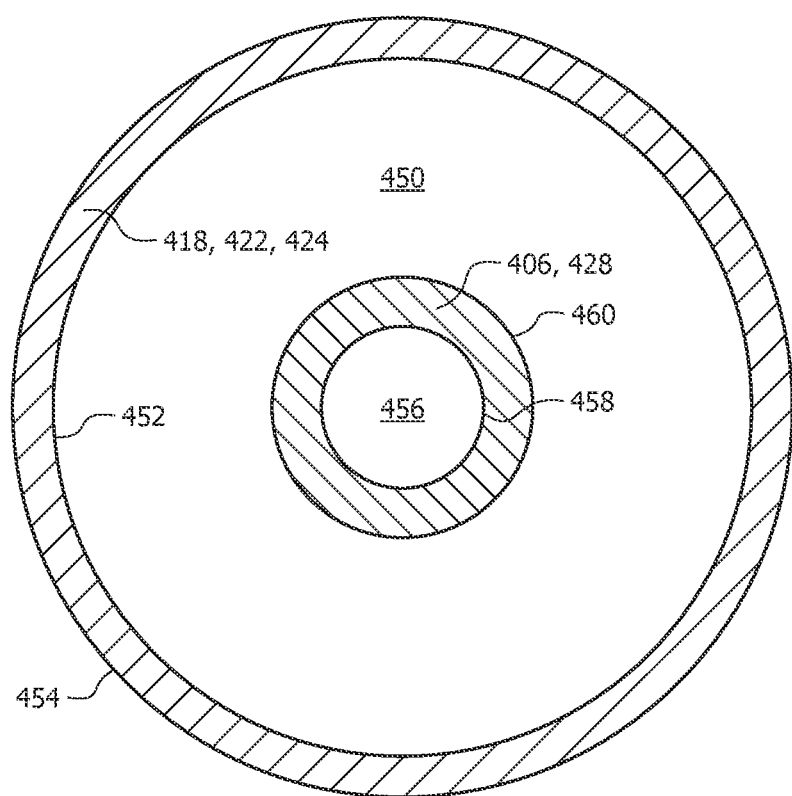
FIG. 4B is a cross-sectional view through the wellbore of the system of FIG. 4A.

In some cases, the fluid conduit 406 of the magma system 400 is configured such that the heat transfer fluid 430 flows through a fluid pathway in an annulus formed between a wall of the wellbore 402 and an outer wall of the fluid conduit 406. FIG. 4B shows a cross sectional view through line 4B-4B of FIG. 4A. FIG. 4B shows the annulus 450 formed between an inner wall 452 of the wellbore 402 and outer wall 460 of the fluid conduit 406 (and/or the optional insulation layer 428). The annulus 450 provides an annular pathway for the flow of heat transfer fluid 430. The inner wall 452 may be the surface of a casing 418, 422 or the uncased surface 424 within the magma reservoir 214 (described above). An outer wall 454 contacts the wall of the borehole 404, either directly or indirectly, e.g., by way of concrete or other material with a high thermal conductivity for attaching the casing 418, 422 to the wall of the borehole 404 as previously described. Heat transfer fluid 430 is transported downward (i.e., toward the magma reservoir 214) through the pathway formed by the annulus 450. The heated heat transfer fluid 430 is then returned to the surface through the hollow center 456 of the fluid conduit 406 (and/or the optional insulation layer 428). The center 456 is formed within the inner wall 458 of the fluid conduit 406.

Figure 6:
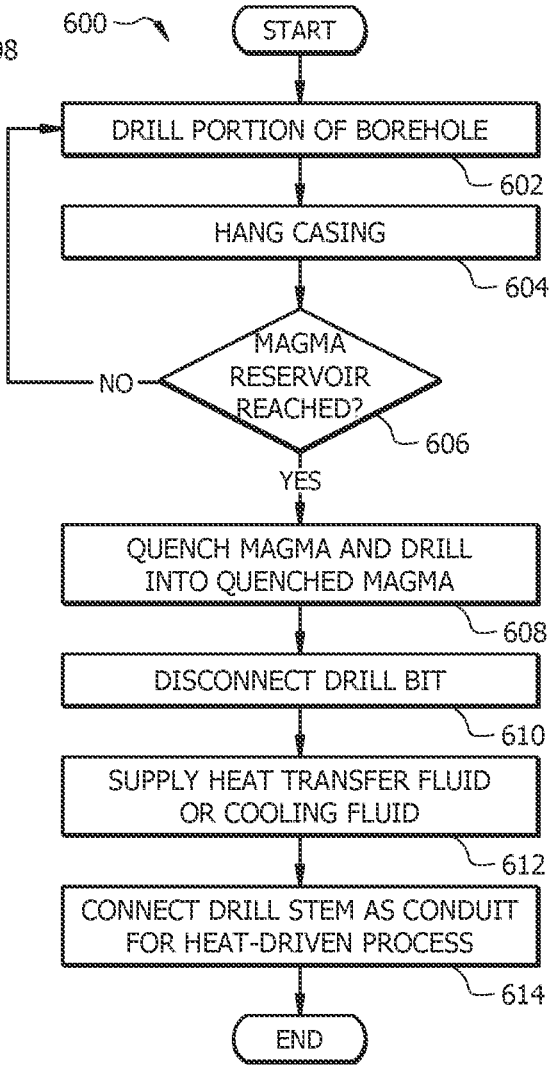
FIG. 6 is a flowchart of an example method for preparing the system of FIG. 4A.

Referring again to FIG. 4A, the wellbore 402 may be prepared by drilling the borehole 404 using a drill bit 426 (see example method 600 of FIG. 6). The drill bit 426 can be attached to a drill stem (e.g., the fluid conduit 406) for drilling the wellbore 402. The drill bit 426 can be any appropriate type of currently used or future-developed drill bit for forming the borehole 404. For example, the drill bit 426 may be a tri-cone drill bit with an integrated underreamer (not shown) that projects radially outward to aid in positioning the casing 418 and/or 422 within the borehole 404. For example, an underreamer may be withdrawn or retracted to allow the drill bit 426 to be extracted from the borehole 404 without simultaneously extracting the well casing 418 and/or 422. In some cases, the drill bit 426 is not extracted from the borehole 404 but is instead left on or removed from the drill stem (e.g., fluid conduit 406) and left at the bottom of the borehole 404. This approach of using the drill bit 426 as a sacrificial drill bit can simplify the drilling process and improve placement of the terminal end 434 of the fluid conduit 406 near the bottom of the borehole 404.

One or more ejection nozzles (not shown for conciseness) may be positioned on the drill bit 426 to supply drilling fluid during drilling operations. For example, drilling fluid may be supplied at an increased pressure to improve the removal of material within the borehole 404. As another example, cooling fluid may be supplied through the drill bit 426 to harden magma adjacent to the drill bit 426 in order to drill into the magma reservoir 214 (i.e., to form and then drill through a portion of the surface 424, described above. Cooling fluid may also or alternatively be supplied through another mechanism, such as down the already drilled portion of the borehole 404 and/or through nozzles located along the casing 418 and/or the fluid conduit 406. Other details and examples of providing cooling fluid into a wellbore are described in U.S. patent application Ser. No. 18/099,499, filed Jan. 20, 2023, and titled "Geothermal Power from Superhot Geothermal Fluid and Magma Reservoirs"; U.S. patent application Ser. No. 18/099,509, filed Jan. 20, 2023, and titled "Geothermal Power from Superhot Geothermal Fluid and Magma Reservoirs"; U.S. patent application Ser. No. 18/099,514, filed Jan. 20, 2023, and titled "Geothermal Power from Superhot Geothermal Fluid and Magma Reservoirs"; U.S. patent application Ser. No. 18/099,518, filed Jan. 20, 2023, and titled "Geothermal Power from Superhot Geothermal Fluid and Magma Reservoirs"; U.S. patent application Ser. No. 18/105,674, filed Feb. 3, 2023, and titled "Wellbore for Extracting Heat from Magma Chambers"; U.S. patent application Ser. No. 18/116,693, filed Mar. 2, 2023, and titled "Geothermal systems and methods with an underground magma chamber"; and U.S. patent application Ser. No. 18/116,697, filed Mar. 2, 2023, and titled "Method and system for preparing a geothermal system with a magma chamber".

In some cases, the wellbore 402 can include additional boreholes (not shown in the example of FIG. 4). For example, borehole 404 may be a primary borehole, and at least one secondary or additional borehole may extend from the primary borehole within the underground magma reservoir 214 to increase heat transfer between the heat transfer fluid 430 and the magma reservoir 214. An example of such a configuration is illustrated in FIG. 10 and described in greater detail below.

The heat transfer fluid 430 may be any appropriate fluid for absorbing heat within the wellbore 402 and driving a thermal process at the heat-driven process system 410. For example, the heat transfer fluid 430 may include water, a brine solution, one or more refrigerants, a thermal oil (e.g., a natural or synthetic oil), a silicon-based fluid, a molten salt, a molten metal, or a nanofluid (e.g., a carrier fluid containing nanoparticles). The heat transfer fluid 430 may be selected at least in part to limit the extent of corrosion of surfaces of the magma system 400. As an example, when the heat transfer fluid 430 is used to drive electricity-generating turbines (see FIG. 12), the heat transfer fluid 430 may be water. The water is supplied in the liquid phase and is transformed into steam within the wellbore 402. The steam can be used to drive turbines for electricity generation.

In some cases, such as to facilitate thermochemical processes requiring higher temperatures than can be achieved using steam or other typical heat transfer fluids, a molten salt heat transfer fluid 430 may be used. A molten salt is a salt that is a liquid at the high operating temperatures experienced in the magma system 400 (e.g., at temperatures between 1,600 and 2,300° F.). In some cases, an ionic liquid may be used as the heat transfer fluid 430. An ionic liquid is a salt that remains a liquid at more modest temperatures (e.g., at or near room temperature). In some cases, a nanofluid may be used as the heat transfer fluid 430. The nanofluid may be a molten salt or ionic liquid with nanoparticles, such as graphene nanoparticles, dispersed in the fluid. Nanoparticles have at least one dimension of 100 nanometers (nm) or less. The nanoparticles increase the thermal conductivity of the molten salt or ionic liquid carrier fluid. This disclosure recognizes that molten salts, ionic liquids, and nanofluids can provide improved performance as heat transfer fluids in the magma systems described in this disclosure (see FIGS. 3, 4A, 7A, and 10). For example, molten salts and/or ionic liquids may be stable at the high temperatures that can be reached in a wellbore that extends into a magma reservoir 214. The high temperatures that can be achieved by these materials not only facilitate increased energy extraction but also can drive thermal processes that were previously inaccessible using previous geothermal technology.

In an example operation of the magma system 400, a heat transfer fluid 430 is stored in a fluid source 416. The fluid pump 408 pumps the heat transfer fluid 430 into the wellbore 402. For example, the heat transfer fluid 430 may be pumped through inlet conduit 412 into an annulus 450 between the internal or inner wall 452 of the wellbore 402 and the external wall 460 of the fluid conduit 406 (see FIG. 4B). The heat transfer fluid 430 travels into the wellbore 402 and increases in temperature. The heat transfer fluid 430 may vaporize and increase in pressure. In some cases, the heat transfer fluid 430 may be superheated. A superheated liquid is a liquid that is heated above its boiling point. A superheated vapor is a material that is in the vapor phase and heated above its vaporization point at a given pressure.

The rate at which the heat transfer fluid 430 is supplied into the wellbore 402 can be adjusted to control the residence time of the heat transfer fluid 430 in the wellbore 402, or more particularly in the portion 420b of the wellbore 402 that extends into the magma reservoir 214. The rate at which the heat transfer fluid 430 is flowed into the wellbore 402 may also be adjusted to reach a target pressure/temperature in the wellbore 402, at the surface 216, and/or at the heat-driven process system 410. For example, the flow rate of a water heat transfer fluid 430 may be adjusted to generate steam at a target pressure for use in the heat-driven process system 410.

The heated heat transfer fluid 430 (whether still a liquid, a vapor/liquid mixture, a vapor, or a superheated liquid or vapor) then flows back toward the surface 216. For example, the heated heat transfer fluid 430 may flow through the center of the fluid conduit 406. The temperature of the heat transfer fluid 430 may decrease to some extent while flowing back towards the surface (e.g., via heat transfer with the cooler heat transfer fluid 430 at a higher level in, or more recently introduced into, the wellbore 402). The insulation layer 428 may help mitigate against this decrease in temperature. Overall, the amount of temperature decrease experienced in the fluid conduit 406 can be accounted for, such that the heat transfer fluid 430 is heated to a temperature in excess of what is needed at the heat-driven process system 410. In this way, the heat transfer fluid 430 can still be at the desired conditions of temperature and/or pressure upon reaching the heat-driven process system 410. The wellhead 432 may include valves to further adjust the pressure in the wellbore 402.

After reaching the surface 216, the heated heat transfer fluid 430 is directed to the heat-driven process system 410. Details of an example heat-driven process system 410 are provided below with respect to FIG. 12. However, as a brief example, the heat-driven process system 410 may include one or more electricity-generating turbines. A vapor portion of the heated heat transfer fluid 430 is provided to the turbine(s) and used to generate electricity. The heat transfer fluid 430 is cooled and condensed during this process (or through subsequent processes), and the cooled, condensed heat transfer fluid 430 is returned to the fluid source 416 via conduit 414. The heat transfer fluid 430 can then be returned to the wellbore 402 to repeat the cycle described above.

Figure 5:
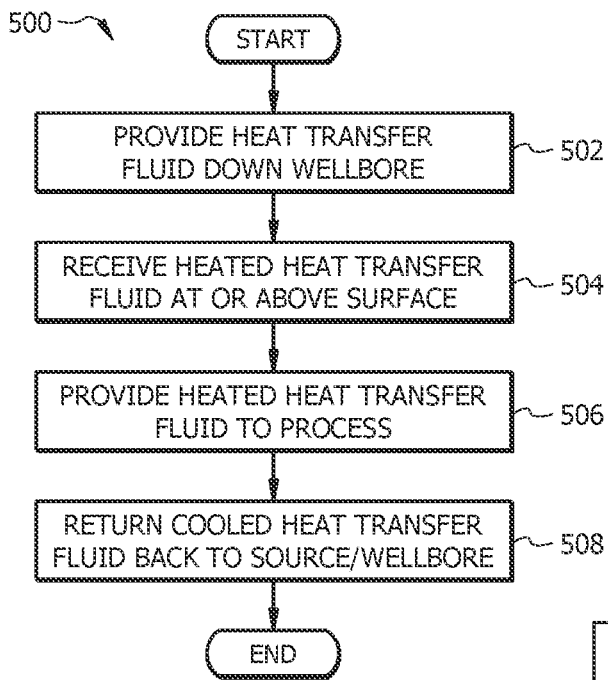
FIG. 5 is a flowchart of an example method for operating the system of FIG. 4A.

Example Methods of Using and Preparing Magma System with a Fully or Partially Cased Wellbore FIG. 5 illustrates an example method 500 of operating the magma system 400 of FIG. 4A. The method 500 may begin at step 502 where heat transfer fluid 430 is provided down the wellbore 402. For example, the fluid pump 408 may pump the heat transfer fluid 430 into the wellbore 402, as described above with respect to FIGS. 4A and 4B. At step 504, heat transfer fluid 430 heated in the wellbore 402 is received at the surface 216. At step 506, the heated heat transfer fluid 430 is provided to the heat-driven process system 410. For example, at least a vapor portion of the heat transfer fluid 430 may be provided to turbine(s) that is/are operated to generate electricity. At step 508, at least a portion of the heat transfer fluid 430 from the heat-driven process system 410 is provided back down the wellbore 402 (e.g., after the heat transfer fluid 430 is cooled and condensed).

FIG. 6 illustrates an example method 600 of preparing the magma system 400 of FIG. 4A. The method 600 may begin at step 602 where a portion of the borehole 404 is drilled. For example, a predefined depth or distance into the ground may be drilled using the drill bit 426. If a casing 418, 422 is desired at the depth, the casing 418, 422 is hung along the drilled portion of the borehole 404 at step 604. The casing 418, 422 may be hung while or after advancing the drill bit 426. At step 606, a determination is made of whether the underground magma reservoir 214 has been reached. If the magma reservoir 214 has not been reached, operations return to step 602 to continue drilling the borehole 404 at step 602. If the magma reservoir 214 has been reached, the method proceeds to step 608.

At step 608, magma in the magma reservoir 214 is quenched with a cooling fluid and is drilled. Cooling fluid may be supplied through nozzles in the drill bit 426, the drill stem/fluid conduit 406, and/or the borehole 404 that has already been drilled. The quenched magma hardens to form a rock plug that can be drilled into and removed using the drill bit 426. This operation continues until a target depth is reached. Once the target depth is reached within the magma reservoir 214, the drill bit 426 may be disconnected at step 610. For example, the drill bit may be disconnected and allowed to remain at the bottom of the borehole 404 as shown in the example of FIG. 4A or the drill stem/fluid conduit 406 may be retracted to recover the drill bit 426. If the drill bit is recovered, the fluid conduit 406 is placed within the borehole 404.

At step 612, a cooling fluid is provided down the borehole 404 to ensure that the surface 424 remains hardened. At step 614, the drill stem/fluid conduit 406 is fluidly connected to the heat-driven process system 410. For example, the fluid conduit 406 may be connected to a wellhead 432 which is in turn in fluid communication with the heat-driven process system 410. Any appropriate fluid connections may be used. The resulting magma system 400 can then be used to perform the steps of method 500 of FIG. 5, described above and any other operations described in this disclosure.

Modifications, omissions, or additions may be made to methods 500, 600 depicted in FIGS. 5 and 6, respectively. Methods 500, 600 may include more, fewer, or other steps. For example, at least certain steps may be performed in parallel or in any suitable order. While at times discussed as magma system 400 performing steps, any suitable component of the magma system 400 or other components of a geothermal system may perform or may be used to perform one or more steps of the methods 500, 600.

Example Magma System with Downhole Chamber for Heating and Pressurization

Figure 7A:
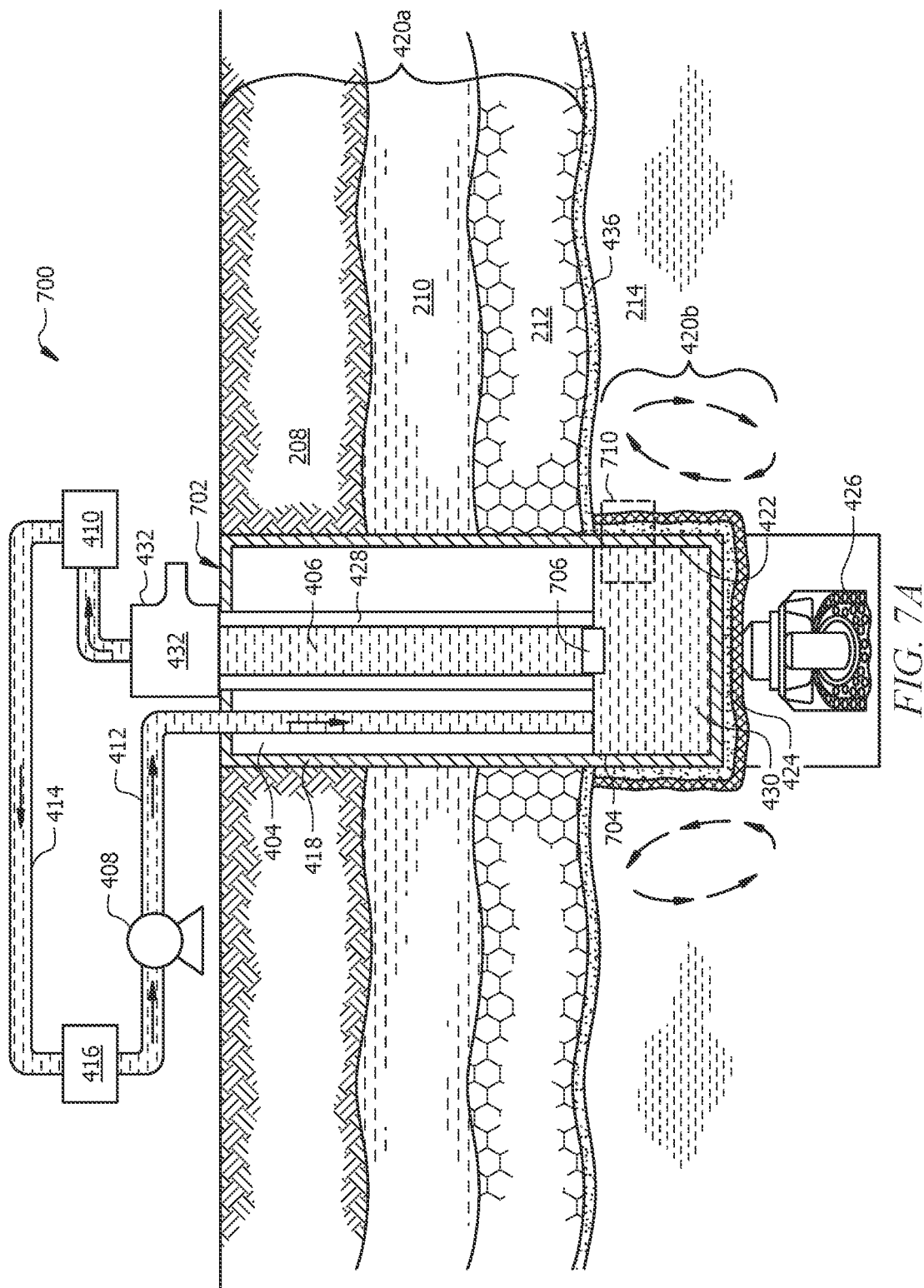
FIG. 7A is a diagram of an improved geothermal system with a downhole pressurized chamber.

In some cases, a magma system, such as the magma system 300 of FIG. 3 includes a dedicated chamber for heating and/or pressurizing a heat transfer fluid to target conditions. FIG. 7A illustrates an example of such a magma system 700 with a chamber 704 located within the borehole 404. Example magma system 700 includes many of the same components and structures of example magma system 400 of FIG. 4A, which function the same or similarly to as described above with respect to FIGS. 4A-6 unless indicated otherwise. However, in the magma system 700, the wellbore 702 includes a chamber 704 located within the borehole 404. The chamber extends at least partially into the underground magma reservoir 214 (i.e., the chamber is at least partially positioned in the lower portion 420b of the borehole 404). In the magma system 700, the inlet conduit 412 facilitates flow of heat transfer fluid 430 from the surface 216 and into the chamber 704. The fluid conduit 406 facilitates flow of heated heat transfer fluid 430 from the chamber 704 toward the surface 216.

The magma system 700 may facilitate improved control of the properties of the heat transfer fluid 430 that can be obtained from the wellbore 702. For example, the pressure of the heat transfer fluid 430 in the chamber 704 can be controlled to facilitate the preparation of a heat transfer fluid 430 (e.g., steam) at a desired temperature and pressure for use in the heat-driven process system 410. For instance, a valve 706 may be positioned to open to allow flow of the heated heat transfer fluid through the outlet conduit when a pressure in the chamber is at least a threshold value. The valve 706 may allow control of the residence time of heat transfer fluid 430 in the chamber 704. The residence time can be adjusted to achieve a desired temperature and/or pressure of heat transfer fluid 430. The valve 706 may be a check valve that opens after a predefined pressure is reached in the chamber 704. The valve may be an electromechanical valve that can be opened based on a signal (e.g., provided by control electronics, not shown for conciseness). For example, the valve 706 may open when a threshold temperature and/or pressure is measured in the chamber 704 (e.g., using a thermocouple or any other appropriate temperature sensor placed on, in, or adjacent to the chamber 704). The threshold pressure and/or temperature for opening the valve 706 to allow flow of heated and pressurized heat transfer fluid 430 toward the surface 216 may be adjusted based on needs at the surface 216. For example, if the heat-driven system 410 is an electricity generation system, higher pressures may be requested in the chamber 704 when electricity demand is increased. An increased pressure may facilitate increased electricity generation.

The chamber 704 is generally any appropriate vessel for storing heat transfer fluid 430. The chamber 704 may be made of a high-melting point alloy or other material that is stable at the relatively high temperatures experienced in the borehole 404. The chamber 704 is generally in thermal contact with the magma reservoir 214. For example, the outer surface of the chamber 704 may be in direct or indirect contact with the surface 424 of the bottom portion 420b of the borehole 404 or a casing 422 disposed in portion 420b. An air gap may not be present between the outer surface of the chamber 704 and the casing 422/surface 424. Instead, one or more thermally conductive materials may be disposed between the outer wall of the chamber 704 and the surface 424 and/or casing 422 to facilitate efficient heat transfer between the magma reservoir 214 and the chamber 704. In some cases, the chamber 704 may be surrounded by a thermally conductive fluid that facilitates heat transfer between the magma reservoir 214 and the chamber 704. In some cases, surface 424 is allowed to melt, such that the chamber 704 is partially surrounded by magma.

Figure 7B:
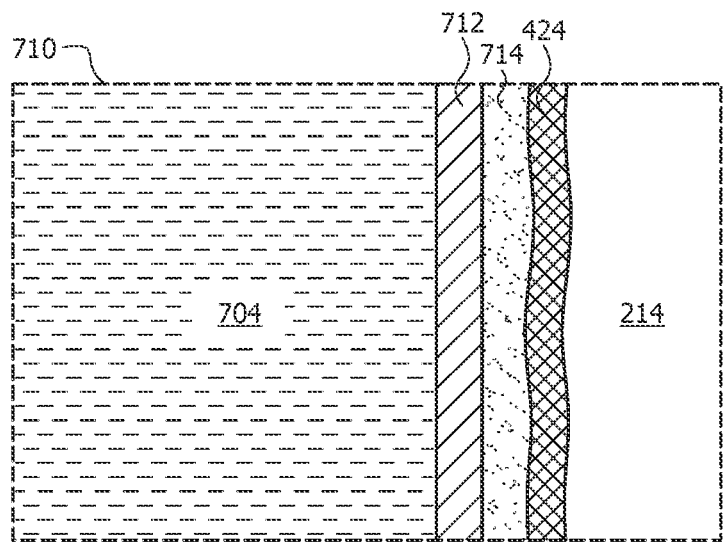
FIGS. 7B and 7C are diagrams showing example cross-sectional views through the system of FIG. 7A, according to embodiments of this disclosure.
Figure 7C:
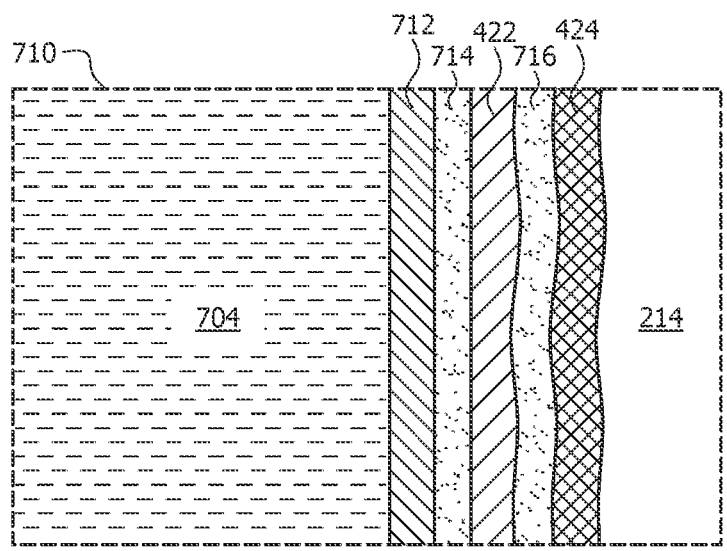

As described above, one or more thermally conductive materials may be employed to connect the chamber 704 to the internal surface 424 or casing 422. Exploded views of region 710 of FIG. 7A are shown in FIGS. 7B and 7C. FIGS. 7B and 7C illustrate example interfaces between the chamber 704 and magma reservoir 214 in region 710. FIG. 7B illustrates the thermal contact between the chamber 704 and magma reservoir 214 when the wellbore 702 is partially cased (see FIG. 4A and corresponding description above), while FIG. 7B illustrates this thermal contact for a cased wellbore 702. In the illustrative example of FIG. 7B, a thermally conductive material 714 provides contact between the wall 712 of the chamber 704 and the surface 424 of the magma reservoir 214. The thermally conductive material 714 may be a thermally conductive cement. The thermally conductive material 714 provided down the wellbore 702 to provide improved thermal contact between the chamber 704 and magma reservoir 214. In the illustrative example of FIG. 7C, the thermally conductive material 714 provides contact between the wall 712 of the chamber 704 and the casing 422 attached to the surface 424 of the magma reservoir 214. The thermally conductive material 714 may be the same as described above with respect to FIG. 7B. An additional layer of thermally conductive material 716 connects the casing 422 to the surface 424 of the wellbore 702. Material 716 may be a thermally conductive cement or similar material.

Referring again to FIG. 7A, in an example operation of the magma system 700, a heat transfer fluid 430 is stored in a fluid source 416. The fluid pump 408 pumps the heat transfer fluid 430 into the chamber 704. For example, the heat transfer fluid 430 may be pumped through inlet conduit 412 into the chamber 704. The heat transfer fluid 430 may be temporarily stored in the chamber 704 while heat transfer with the magma reservoir 214 increases the temperature and pressure of the heat transfer fluid 430. For example, valve 706 may prevent the heat transfer fluid 430 from exiting the chamber 704 until at least a threshold or target pressure/temperature is reached. As an example, if water heat transfer fluid 430 is provided to the chamber 704, the water may be heated and transformed into steam. The steam may not be released from the chamber 704 until at least a threshold pressure is reached. In some cases, the steam heat transfer fluid 430 may be superheated. In some cases, the rate at which the heat transfer fluid 430 is supplied into the wellbore 402 is adjusted to control the residence time of the heat transfer fluid 430 in the chamber 704 and/or adjust the pressure of the heat transfer fluid 430 in the chamber 704.

The heated, pressurized heat transfer fluid 430 then flows back toward the surface 216. For example, the heated heat transfer fluid 430 may flow through the fluid conduit 406. The temperature and pressure of the heat transfer fluid 430 may decrease to some extent while flowing back towards the surface (e.g., via heat transfer with the cooler environment at a higher level in the wellbore 702). The insulation layer 428 may help mitigate this decrease in temperature and pressure. Overall, the amount of temperature decrease experienced in the fluid conduit 406 can be accounted for, such that the heat transfer fluid 430 is heated to a temperature and pressure in the chamber 704 that is in excess of what is needed at the heat-driven process system 410. In this way, the heat transfer fluid 430 can still be at the desired conditions of temperature and/or pressure upon reaching the heat-driven process system 410.

After reaching the surface 216, the heated, pressurized heat transfer fluid 430 is directed to the heat-driven process system 410. Details of an example heat-driven process system 410 are provided below with respect to FIG. 12. However, as a brief example, the heat-driven process system 410 may include one or more electricity-generating turbines. A vapor portion of the heated heat transfer fluid 430 is provided to the turbine(s) and used to generate electricity. The heat transfer fluid 430 is cooled and condensed during this process (or through subsequent processes), and the cooled, condensed heat transfer fluid 430 is returned to the fluid source 416 via conduit 414. The heat transfer fluid 430 can then be returned to the chamber 704 to repeat the cycle described above.

Example Methods of Using and Preparing Magma System with Downhole Chamber

Figure 8:
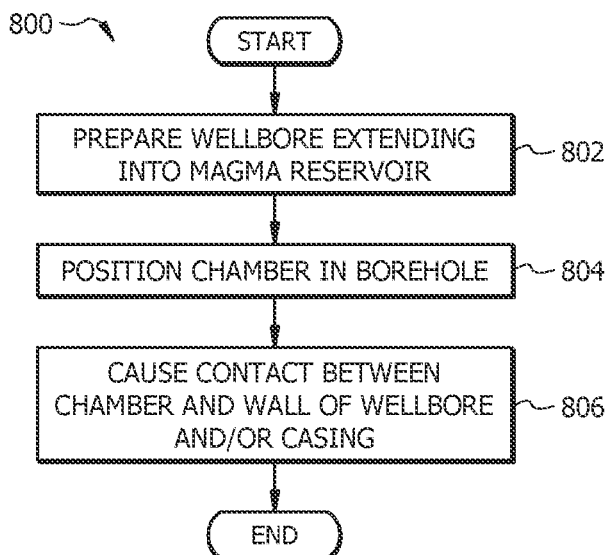
FIG. 8 is a flowchart of an example method for preparing the system of FIG. 7A.

FIG. 8 shows an example method 800 of preparing the magma system 700 of FIG. 7A. The method 800 may begin at step 802 where the wellbore 702 is prepared. For example, the borehole 404 may be drilled into the magma reservoir 214 and a casing 418 and/or 422 may be placed in the reservoir. Preparation of wellbore 702 may be achieved using steps of the method 600 of FIG. 6 with or without modification. At step 804, the chamber 704 is placed in the wellbore 702. For example, the chamber 704 may be lowered into the wellbore 702 at a desired depth (e.g., to achieve desired temperature/pressure conditions based on heat transfer with the magma reservoir 214). At step 806, the chamber 704 is placed in thermal contact with the magma reservoir 214, as described above with respect to FIGS. 7A-C. For example, one or more thermally conductive layers (e.g., of materials 714 and/or 716—see FIGS. 7B and 7C) may be used to place the chamber 704 in thermal contact with the magma reservoir 214. Fluid conduits 412 and 406 are connected to the chamber 704.

Figure 9:
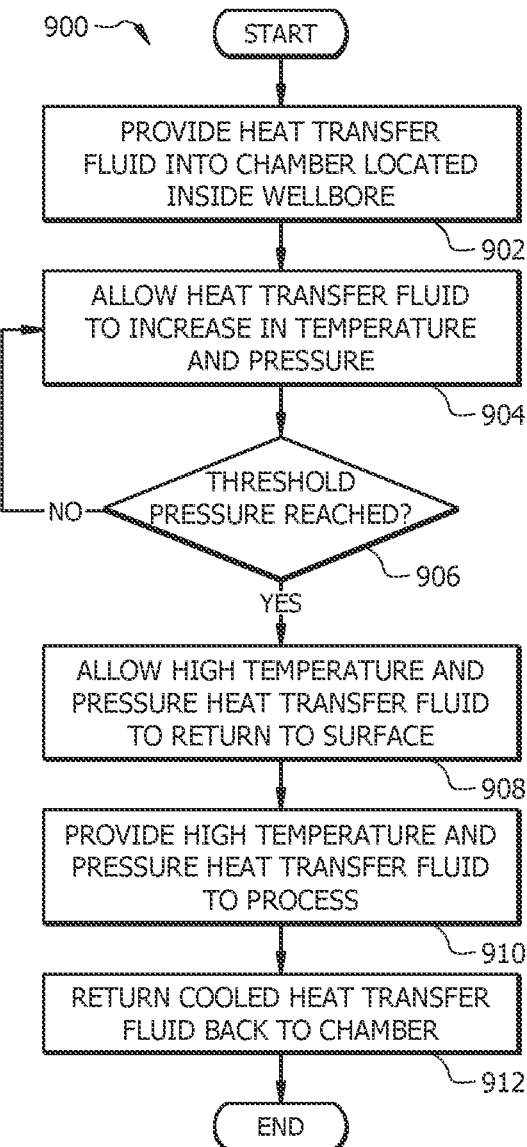
FIG. 9 is a flowchart of an example method for operating the system of FIG. 7A.

FIG. 9 shows an example method 900 of operating the example magma system 700 of FIG. 7A. The method 900 may begin at step 902 where heat transfer fluid 430 is provided to the chamber 704 in wellbore 702. For example, the fluid pump 408 may pump the heat transfer fluid 430 into the chamber 704, as described above with respect to FIG. 7A. At step 904, heat transfer between the chamber 704 and the magma reservoir 214 is allowed to heat the heat transfer fluid 430 in the chamber 704. At step 906, a determination is made of whether a threshold or target pressure has been achieved in the chamber 704. If this is not the case, further heat transfer is allowed by returning to step 904, such that the heat transfer fluid 430 can increase in temperature and pressure in the chamber 704.

If the threshold or target pressure is achieved at step 906, the method 900 proceeds to step 908 where the heated, pressurized heat transfer fluid 430 is allowed to return to the surface 216 (e.g., via fluid conduit 406). At step 910, the heated heat transfer fluid 430 is provided to the heat-driven process system 410. For example, at least a vapor portion of the heat transfer fluid 430 may be provided to turbine(s) that is/are operated to generate electricity. At step 912, at least a portion of the heat transfer fluid 430 from the heat-driven process system 410 is provided back to the chamber 704 (e.g., after the heat transfer fluid 430 is cooled and condensed).

Modifications, omissions, or additions may be made to methods 800, 900 depicted in FIGS. 8 and 9, respectively. Methods 800, 900 may include more, fewer, or other steps. For example, at least certain steps may be performed in parallel or in any suitable order. While at times discussed as magma system 700 performing steps, any suitable component of the magma system 700 or other components of a geothermal system may perform or may be used to perform one or more steps of the methods 800, 900.

Example Magma System with Secondary Borehole(s)

In some cases, a magma system, such as the magma system 300 of FIG. 3 and magma system 400 of FIG. 4A includes one or more secondary boreholes extending from a primary borehole. FIG. 10 illustrates an example of such a magma system 1000 with secondary boreholes 1006a-c extending from the primary borehole 1004, which may be the same as or similar to borehole 404 of FIG. 4A). Example magma system 1000 includes many of the same components and structures of example magma system 400 of FIG. 4A, which function the same or similarly to as described above with respect to FIGS. 4A-6 unless indicated otherwise. However, in the magma system 1000, the wellbore 1002 includes the primary borehole 1004 with an opening at the surface 216 and an end 1016 at a predetermined depth within the underground magma reservoir 214 as well as at least one secondary borehole 1006a-c extending from the primary borehole 1004 further into the underground magma reservoir 214.

The primary borehole 1004 can be fully or partially cased. For example, as described with respect to the magma system 400 of FIG. 4A, a casing (not shown for clarity and conciseness) may be applied to all or a portion of the primary borehole 1004. The casing 418 may extend at least until about the ceiling 436 of the magma reservoir 214. The casing 418 may extend at least partially into the lower portion 420b of the primary borehole 1004.

The secondary boreholes 1006a-c may extend in a number of directions and/or angles from the primary borehole 1004. The secondary boreholes 1006a-c may have an internal wall or surface 424 formed of hardened magma, similarly to as described above with respect to FIG. 4A. For example, one or more secondary boreholes, such as example secondary borehole 1006a may extend horizontally (e.g., at about 90 degrees relative to the direction 1008 of the primary borehole 1004). For example, secondary borehole 1006a extends from the primary borehole 1004 at an angle 1010 relative to a direction 1008 of the primary borehole 1004. Direction 1008 is generally a downward direction extending from the surface 216 to the end 1016 of the primary borehole 1004. In some cases, a secondary borehole may extend from a secondary borehole. The additional secondary borehole 1006b extends at an angle 1012 relative to the secondary borehole 1006a. One or more secondary boreholes may extend at angles either extending deeper into the Earth or slanting back towards the surface 216. For example, as shown in the example of FIG. 10, a secondary borehole 1006c extends at an angle 1014 relative to the direction 1008 of the primary borehole 1004. Secondary borehole 1006c changes direction along its length.

Although shown for the sake of clarity and conciseness as beginning from within the magma reservoir 214, one or more secondary boreholes 1006a-c may begin from a position above the magma reservoir 214, such from any of the higher layers 208, 210, 212, and extend into the magma reservoir 214 or to another desired depth. Overall, the primary borehole 1004 and secondary boreholes 1006a-c may form a network of interconnected boreholes such that there is an increased surface area within the magma reservoir 214 for heat transfer between the magma reservoir 214 and the heat transfer fluid 430 provided down the wellbore 1002. The size and shape of this network (e.g., the length, direction, number of branches, etc.) may be determined to improve heat transfer based on the shape of the magma reservoir 214 or the thermal requirements of the heat-driven process system 410. In some cases, a single fluid conduit similar to inlet conduit 412 of FIG. 4A may supply heat transfer fluid 430 into the wellbore 1002. However, as illustrated in FIG. 10, it may be advantageous to include multiple inlet conduits 412a,b to help facilitate the flow of heat transfer fluid 430 into the secondary boreholes 1006a-c. For example, FIG. 10 illustrates an example configuration in which a first inlet conduit 412a provides a flow of heat transfer fluid 430 into secondary borehole 1006c, while another inlet fluid conduit 412b provides a flow of heat transfer fluid 430 into secondary boreholes 1006a and 1006b. In some cases, inlet conduits 412a,b may include bifurcations with multiple outlets to facilitate flow to multiple secondary boreholes 1006a-c.

In an example operation of the magma system 1000, a heat transfer fluid 430 is stored in a fluid source 416. The fluid pump 408 pumps the heat transfer fluid 430 into the wellbore 1002. For example, the heat transfer fluid 430 may be pumped through inlet conduits 412a/412b and into one or more of the secondary boreholes 1006a-c where heat transfer occurs between the heat transfer fluid 430 and the magma reservoir 214. The heat transfer fluid 430 travels through the secondary boreholes 1006a-c and towards the primary borehole 1004 where heat transfer can continue to occur. This heat transfer increases the temperature of the heat transfer fluid 430. The pressure of the heat transfer fluid 430 may also be increased. For instance, water heat transfer fluid 430 may be transformed into steam at an increased pressure. The steam heat transfer fluid 430 may be superheated. The rate at which the heat transfer fluid 430 is supplied into the wellbore 1002 can be adjusted to control the residence time of the heat transfer fluid 430 in the wellbore 1002, or more particularly in the portion 420b of the wellbore 1002 that extends into the magma reservoir 214 (e.g., in the network of secondary boreholes 1006a-c).

The heated heat transfer fluid 430 then flows back toward the surface 216. For example, the heated heat transfer fluid 430 may flow through the fluid conduit 406. An insulation layer 428 may help mitigate against a decrease in temperature and/or pressure of the heat transfer fluid 430 as it travels towards to the surface 216. Overall, the amount of temperature decrease experienced in the fluid conduit 406 can be accounted for, such that the heat transfer fluid 430 is heated to a temperature and/or pressure in excess of what is needed at the heat-driven process system 410. In this way, the heat transfer fluid 430 can still be at the desired conditions of temperature and/or pressure upon reaching the heat-driven process system 410. The wellhead 432 may include valves to further adjust the pressure in the wellbore 1002.

Figure 12:
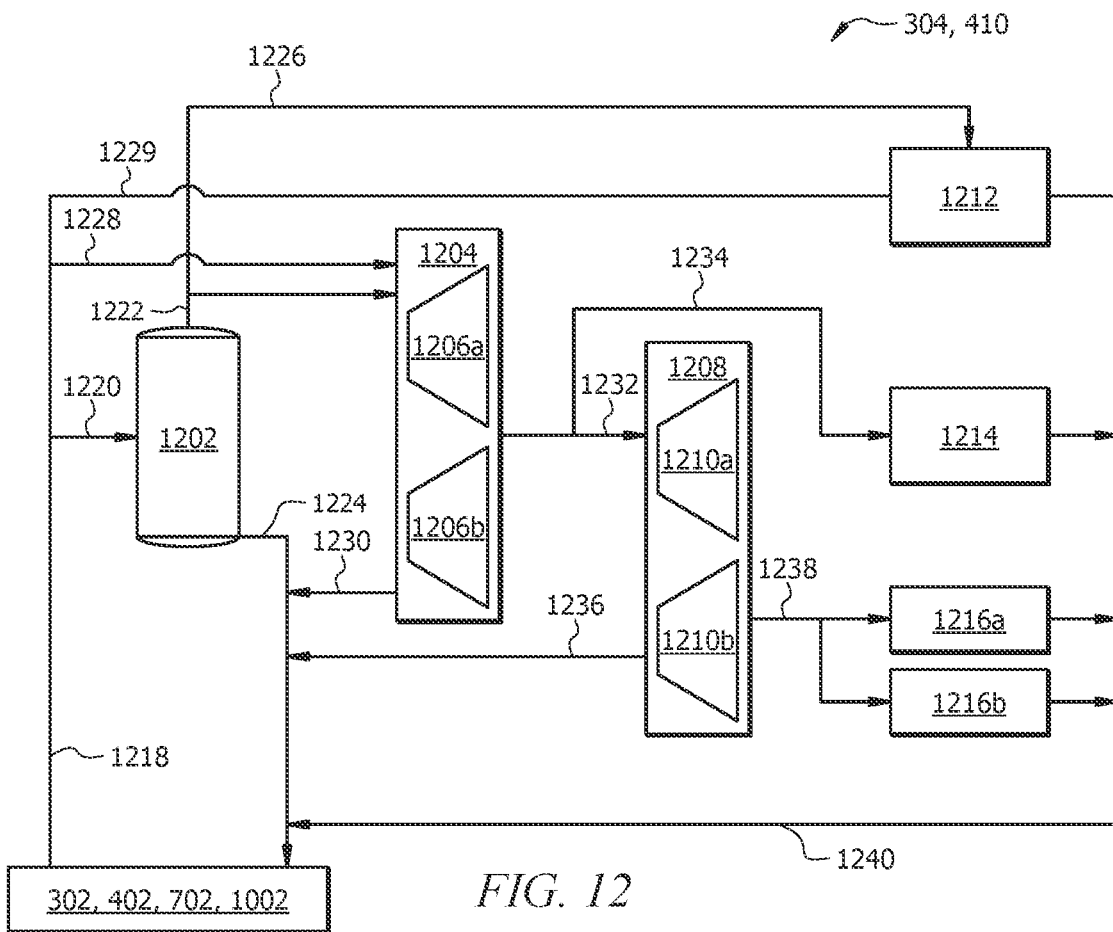
FIG. 12 is a diagram of an example system for performing heat-driven processes.

After reaching the surface 216, the heated heat transfer fluid 430 is directed to the heat-driven process system 410 (see FIG. 12). As a brief example, the heat-driven process system 410 may include one or more electricity-generating turbines. A vapor portion of the heated heat transfer fluid 430 is provided to the turbine(s) and used to generate electricity. The heat transfer fluid 430 is cooled and condensed during this process (or through subsequent processes), and the cooled, condensed heat transfer fluid 430 is returned to the fluid source 416 via conduit 414. The heat transfer fluid 430 can then be returned to the wellbore 1002 to repeat the cycle described above.

Example Methods of Using and Preparing Magma System with Secondary Borehole(s)

FIG. 11 shows an example method 1100 for preparing the wellbore 1002 of FIG. 10. The method 1100 may begin at step 1102 where the primary borehole 1004 is drilled into the magma reservoir 214. The primary borehole 1004 may be drilled as described above with respect to FIG. 6. At step 1104, the one or more secondary boreholes 1006a-c are drilled. For example, after all or at least a portion of the primary borehole 1004 is drilled, the drill bit 426 may be adjusted to a desired angle for producing a secondary borehole 1006a-c. For instance, secondary borehole 1006a may be drilled by rotating the drill bit 426 to drill at angle 1010. When the secondary borehole 1006a is complete, the drill bit 426 may be backed out through borehole 1006a until the position of borehole 1006b. The drill bit may then be rotated by angle 1012, and borehole 1006b may be drilled. The drill bit 426 may then be backed out of boreholes 1006b and 1006a and rotated to angle 1014 relative to the direction 1008 of the primary borehole 1004. Borehole 1006c may then be drilled. The drill bit 426 may then be backed out and removed as shown in FIG. 10, removed and allowed to remain within the wellbore 1002, left on the drill stem/fluid conduit 406, or removed from the wellbore 1002. In some cases, multiple drill bits 426 may be employed to drill one or more of the boreholes 1004, 1006a-c, as appropriate. Any directional drilling technique currently available or developed in the future may be employed to drill boreholes 1004, 1006a-c. The resulting magma system 1000 may be operated as described above with respect to FIG. 10 and/or according to the method 500 of FIG. 5.

Modifications, omissions, or additions may be made to method 1100 depicted in FIG. 11. Method 1100 may include more, fewer, or other steps. For example, at least certain steps may be performed in parallel or in any suitable order. While at times discussed as magma system 1000 performing steps, any suitable component of the magma system 1000 or other components of a geothermal system may perform or may be used to perform one or more steps of the method 1100.

Example Heat-Driven Process System

FIG. 12 shows a schematic diagram of an example heat-driven process system 304, 410 of this disclosure. The heat-driven process system 304, 410 includes a condenser

1202, a first turbine set 1204, a second turbine set 1208, a high-temperature/pressure thermochemical process 1212, a medium-temperature/pressure thermochemical process 1214, and one or more lower temperature/pressure processes 1216*a-b*. The heat-driven process system 304, 410 may include more or fewer components than are shown in the example of FIG. 12. For example, a heat-driven process system 304, 410 used for power generation alone may omit the high-temperature/pressure thermochemical process 1212, medium-temperature/pressure thermochemical process 1214, and lower temperature/pressure processes 1216*a-b*. Similarly, a heat-driven process system 304, 410 that is not used for power generation may omit the turbine sets 1204, 1208. As a further example, if heat transfer fluid 430 is known to be received only in the gas phase, the condenser 1202 may be omitted in some cases. The ability to tune the properties of the heat transfer fluid 430 received from the unique wellbores 402, 702, 1002 described in this disclosure generally facilitates improved and more flexible operation of the heat-driven process system 304, 410. For example, the depth of the wellbore 402, 702, 1002, the residence time of heat transfer fluid 430 in the wellbore 402, 702, 1002, the pressure achieved in the wellbore 402, 702, 1002 and/or downhole chamber 704, the number and length of secondary boreholes 1006*a-c* in wellbore 1002, and the like can be selected or adjusted to provide desired heat transfer fluid properties at the heat-driven process system 304, 410.

In the example of FIG. 12, the condenser 1202 is connected to the wellbore 402, 702, 1002 that extends between a surface and the underground magma reservoir. The condenser 1202 separates a gas-phase heat transfer fluid 430 (e.g., steam) from liquid-phase heat transfer fluid 430 (e.g., condensate formed from the gas-phase heat transfer fluid 430). The condenser 1202 may be a steam separator. A stream 1220 received from the wellbore 402, 702, 1002 may be provided to the condenser 1202. In some cases, all of stream 1218 is provided in stream 1220. In other cases, a fraction or none of stream 1218 is provided to the condenser 1202. Instead, all or a portion of the stream 1218 may be provided as stream 1228 which may be provided to the first turbine set 1204 and/or to a high-pressure thermal process 1212 in stream 1229. The thermal process 1212 may be a thermochemical reaction requiring high temperatures and/or pressures (e.g., temperatures of between 500 and 2,000° F. and/or pressures of between 1,000 and 4,500 psig). One or more valves (not shown for conciseness) may be used to control the direction of stream 1220 to the condenser 1202, first turbine set 1204, and/or thermal process 1212. A gas-phase stream 1222 of heat transfer fluid 430 from the condenser may be sent to the first turbine set 1204 and/or the thermal process 1212 via stream 1226. A liquid-phase stream 1224 of heat transfer fluid 430 from the condenser 1202 may be provided back to the wellbore 402, 702, 1002 (e.g., or to a fluid source 416—see FIGS. 4A, 7A, and 10).

The first turbine set 1204 includes one or more turbines 1206*a-b*. In the example of FIG. 12, the first turbine set includes two turbines 1206*a-b*. However, the first turbine set 1204 can include any appropriate number of turbines for a given need. The turbines 1206*a-b* may be any known or yet to be developed turbine for electricity generation. The turbine set 1204 is connected to the condenser 1202 and is configured to generate electricity from the gas-phase heat transfer fluid 430 (e.g., steam) received from the condenser 1202 (stream 1222). A condensate stream 1230 exits the set of turbines 1204. The condensate stream 1230 may be provided back to the wellbore 402, 702, 1002 (e.g., sent to the fluid source 416 of FIGS. 4A, 7A, and 10).

If the heat transfer fluid 430 is at a sufficiently high temperature, as may be uniquely and more efficiently possible using the wellbores 402, 702, 1002 of this disclosure, a stream 1232 of gas-phase heat transfer fluid 430 may exit the first turbine set 1204. Stream 1232 may be provided to a second turbine set 1208 to generate additional electricity. The turbines 1210*a-b* of the second turbine set 1208 may be the same as or similar to turbines 1206*a-b*, described above.

All or a portion of stream 1232 may be sent as gas-phase stream 1234 to a thermal process 1214. Process 1214 is generally a process requiring gas-phase heat transfer fluid 430 at or near the conditions of the heat transfer fluid exiting the first turbine set 1204. For example, the thermal process 1214 may include one or more thermochemical processes requiring steam or another heat transfer fluid 430 at or near the temperature and pressure of stream 1232 (e.g., temperatures of between 250 and 1,500° F. and/or pressures of between 500 and 2,000 psig). The second turbine set 1208 may be referred to as "low pressure turbines" because they operate at a lower pressure than the first turbine set 1204. Condensate from the second turbine set 1208 is provided back to the wellbore 402, 702, 1002 via stream 1236.

An effluent stream 1238 from the second turbine set 1208 may be provided to one or more thermal process 1216*a-b*. Thermal processes 1216*a-b* generally require less thermal energy than processes 1212 and 1214, described above (e.g., processes 1216*a-b* may be performed temperatures of between 220 and 700° F. and/or pressures of between 15 and 120 psig). As an example, processes 1216*a-b* may include water distillation processes, heat-driven chilling processes, space heating processes, agriculture processes, aquaculture processes, and/or the like. For instance, an example heat-driven chiller process 1216*a* may be implemented using one or more heat driven chillers. Heat driven chillers can be implemented, for example, in data centers, crypto-currency mining facilities, or other locations in which undesirable amounts of heat are generated. Heat driven chillers, also conventionally referred to as absorption cooling systems, use heat to create chilled water. Heat driven chillers can be designed as direct-fired, indirect-fired, and heat-recovery units. When the effluent includes low pressure steam, indirect-fired units may be preferred.

At least one advantage of using the heat-driven process system 304, 410 in combination with the improved magma systems 300, 400, 700, 1000 of this disclosure is the ability to achieve an increased efficiency, which can be attributed, for example, to a simpler operational design with fewer parasitic loads such as from pumps and thermal losses (e.g., through the use of multiple heat exchange processes, rather than using the heat transfer fluid 430 that is heated in the wellbore 402, 702, 1002 directly in the heat-driven process system 304, 410). The superior heat source embodied by the example wellbores 402, 702, 1002 of this disclosure provide a higher ratio of usable energy to entropy than was possible using previous geothermal technology. Another example technical advantage of the magma systems of this disclosure is the ability implement multiple processes in series, such that remaining steam or other relatively high temperature and pressure heat transfer fluid from one process can be used in another down-stream process. This may also decrease energy expended to cool heat transfer fluid before it is returned to the wellbore 402, 702, 1002. An effluent stream 1240 from processes 1212, 1214, and/or 1216*a-b* may be provided back to wellbore 302, 402, 702, 1002.

This disclosure describes example systems 300, 400, 700, 1000 that may facilitate improved geothermal operations. While these example systems 300, 400, 700, 1000 are described as employing heating through thermal contact with a magma reservoir 214, it should be understood that this disclosure also encompasses similar systems in which another thermal reservoir or heat source is harnessed. For example, heat transfer fluid may be heated by underground water at an elevated temperature. As another example, heat transfer fluid may be heated by radioactive material emitting thermal energy underground or at or near the surface. As yet another example, heat transfer fluid may be heated by lava, for example, in a lava lake or other formation. As such, the magma reservoir 214 of FIGS. 3, 4A, 7A, and 10 may be any thermal reservoir or heat source that is capable of heating heat transfer fluid to achieve desired properties (e.g., of temperature and pressure). Furthermore, the thermal reservoir or heat source may be naturally occurring or artificially created (e.g., by introducing heat underground that can be harnessed at a later time for energy generation or other thermal processes).

Additional Embodiments

The following descriptive embodiments are offered in further support of the one or more aspects of the disclosure.

Embodiment 1. A geothermal system for obtaining heated heat transfer fluid via heat transfer with an underground reservoir of magma, the geothermal system comprising:
  a wellbore extending between a surface and into the underground reservoir of magma;
  a fluid pump configured to provide a flow of heat transfer fluid toward the underground reservoir of magma; and
  a fluid conduit extending from the surface toward a terminal end of the wellbore, the fluid conduit configured to allow flow of heated heat transfer fluid from a portion of the wellbore that extends into the underground reservoir of magma toward the surface, wherein the geothermal system optionally includes any one or more following limitations:
    wherein the fluid pump is configured to provide the flow of the heat transfer fluid through an annulus formed between a wall of the wellbore and an outer wall of the fluid conduit;
    wherein the fluid conduit comprises a drill stem positioned within the wellbore;
    wherein the wellbore comprises:
  a borehole with an opening at the surface and an end at a predetermined depth within the underground reservoir of magma; and
  a casing disposed within the borehole and extending from the surface until at least a ceiling of the underground reservoir of magma;
    wherein the casing extends into the underground reservoir of magma;
    wherein the casing extends no more than partially into the underground reservoir of magma, wherein a surface of the borehole within the underground reservoir of magma comprises hardened magma;
    wherein the wellbore comprises:
  a primary borehole with an opening at the surface and an end at a predetermined depth within the underground reservoir of magma; and
  at least one secondary borehole extending from the primary borehole within the underground reservoir of magma;
    wherein the heat transfer fluid comprises one or more of: water, a brine solution, one or more refrigerants, and one or more thermal oils;
    wherein the heat transfer fluid comprises one or more of a molten salt, an ionic liquid, and a nanofluid;
    wherein the fluid conduit is further coupled to a heat-driven process apparatus, wherein the heat-driven process apparatus comprises one or more of turbines, reaction vessels, condensers, a water distillation system, a heat driven chilling apparatus, a residential heating system, an agriculture system, and an aquaculture system;
    wherein at least a portion of the heat transfer fluid from the heat-driven process apparatus is returned to the wellbore; and/or
    wherein the fluid conduit comprises an insulation layer.

Embodiment 2. A method of operating a geothermal system, the method comprising:
  providing a heat transfer fluid down a wellbore extending from a surface and into an underground reservoir of magma;
  receiving heated heat transfer fluid from the wellbore; and
  providing the heated heat transfer fluid to a heat-driven process, and wherein the method optionally includes any one or more following limitations:
    returning at least a portion of the heat transfer fluid from the heat-driven process back down the wellbore; and/or
    wherein:
  the heat transfer fluid provided down the wellbore comprises liquid water and the heated heat transfer fluid received from the wellbore comprises steam; and
  providing the heated heat transfer fluid to the heat-driven process comprises:
    providing at least a portion of the steam to at least one turbine; and
    operating the at least one turbine with the steam to generate electricity.

Embodiment 3. A geothermal system, comprising:
  a fluid pump configured to provide a flow of heat transfer fluid through a wellbore from a surface and toward an underground reservoir of magma; and
  a fluid conduit extending from the surface toward a terminal end of the wellbore located within a portion of the wellbore that extends into the underground reservoir of magma, the fluid conduit configured to allow flow of heated heat transfer fluid from the portion of the wellbore that extends into the underground reservoir of magma toward the surface, wherein the geothermal system optionally includes any one or more following limitations:
    wherein the fluid pump is configured to provide the flow of the heat transfer fluid through an annulus formed between a wall of the wellbore and an outer wall of the fluid conduit;
    wherein the fluid conduit comprises a drill stem positioned within the wellbore;
    wherein the heat transfer fluid comprises one or more of: water, a brine solution, one or more refrigerants, one or more thermal oils, a molten salt, an ionic liquid, and a nanofluid; and/or
    wherein the fluid conduit comprises an insulation layer.

Embodiment 4. A partially cased wellbore, the partially cased wellbore comprising:
  a first borehole portion extending from a surface towards an underground magma reservoir, the first borehole portion comprising a casing extending from a first end at the surface; and
  a second borehole portion extending from a terminal end of the first borehole portion to a terminal end of the wellbore, wherein the second borehole portion extends into the underground magma reservoir and a wall of the second borehole portion is hardened magma, wherein the partially cased wellbore optionally includes any one or more following limitations:
  a fluid pathway extending from an inlet at the surface to the terminal end of the wellbore and then from the terminal end to an outlet at or above the surface, wherein the fluid pathway is configured to receive a heat transfer fluid at the inlet and expel heated heat transfer fluid from the outlet;
  wherein the fluid pathway comprises:
an annular pathway formed in the first borehole portion between the casing and an external wall of a fluid conduit positioned within the partially cased wellbore;
an annular pathway in the second borehole portion between the wall of the second borehole portion and the external wall of a fluid conduit; and
a pathway within the fluid conduit;
  wherein the fluid conduit is a drill stem with a drill bit removed;
  wherein the fluid conduit comprises an insulation layer;
  wherein the casing comprises an alloy attached to an internal wall of the first borehole portion;
  at least one secondary borehole extending from the second borehole portion within the underground magma reservoir; and/or
  a plurality of secondary boreholes extending from the second borehole portion within the underground magma reservoir, wherein the plurality of secondary boreholes forms a network of boreholes with the underground magma reservoir.

Embodiment 5. A geothermal system, comprising:
a partially cased wellbore;
a fluid pump configured to provide a flow of heat transfer fluid through the partially cased wellbore from a surface and toward an underground magma reservoir; and
a heat-driven process apparatus, wherein the heat-driven process apparatus comprises one or more of turbines, reaction vessels, condensers, a water distillation system, a heat driven chilling apparatus, a residential heating system, an agriculture system, and an aquaculture system, wherein the geothermal system optionally includes any one or more following limitations:
wherein the partially cased wellbore comprises:
a first borehole portion extending from the surface towards the underground magma reservoir, the first borehole portion comprising a casing extending from a first end at the surface; and
a second borehole portion extending from a terminal end of the first borehole portion to a terminal end of the wellbore, wherein the second borehole portion extends into the underground magma reservoir and a wall of the second borehole portion is hardened magma;
  wherein the partially cased wellbore further comprises a fluid pathway extending from an inlet at the surface to the terminal end of the wellbore and then from the terminal end to an outlet at or above the surface, wherein the fluid pathway is configured to receive a heat transfer fluid at the inlet and expel heated heat transfer fluid from the outlet;
  wherein the fluid pathway comprises:
an annular pathway formed in the first borehole portion between the casing and an external wall of a fluid conduit positioned within the partially cased wellbore;
an annular pathway in the second borehole portion between the wall of the second borehole portion and the external wall of a fluid conduit; and
a pathway within the fluid conduit;
  wherein the fluid conduit is a drill stem with a drill bit removed;
  wherein the fluid conduit is a drill stem with a drill bit attached to the drill stem;
  wherein the fluid conduit comprises an insulation layer;
  wherein the casing comprises an alloy attached to an internal wall of the first borehole portion;
  wherein the partially cased wellbore further comprises at least one secondary borehole extending from the second borehole portion within the underground magma reservoir;
  wherein the partially cased wellbore further comprises a plurality of secondary boreholes extending from the second borehole portion within the underground magma reservoir, wherein the plurality of secondary boreholes form a network of boreholes with the underground magma reservoir;
  wherein the heat transfer fluid comprises one or more of: water, a brine solution, one or more refrigerants, and one or more thermal oils;
  wherein the heat transfer fluid comprises one or more of a molten salt, an ionic liquid, and a nanofluid; and/or
  wherein at least a portion of the heat transfer fluid from the heat-driven process apparatus is returned to the wellbore.

Embodiment 6. A method, comprising:
supplying heat transfer fluid to a partially cased wellbore, the partially cased wellbore comprising:
  a first borehole portion extending from a surface towards an underground magma reservoir, the first borehole portion comprising a casing extending from a first end at the surface; and
  a second borehole portion extending from a terminal end of the first borehole portion to a terminal end of the wellbore, wherein the second borehole portion extends into the underground magma reservoir and a wall of the second borehole portion is hardened magma;
receiving heat transfer fluid heated in the partially cased wellbore; and
providing at least part of a gas-phase portion of the heated heat transfer fluid to a heat-driven process, wherein the method optionally includes any one or more following limitations:
  wherein providing at least part of the gas-phase portion of the heated heat transfer fluid to the heat-driven process comprises:
providing at least part of the gas-phase portion of the heated heat transfer fluid to a turbine;
operating the turbine with the gas-phase heat transfer fluid to generate electricity; and
directing at least some condensed heat transfer fluid back to the partially cased wellbore.

Embodiment 7. A wellbore, the wellbore comprising:
a borehole extending from a surface into an underground reservoir of magma;
a chamber located within the borehole and extending at least partially into the underground reservoir of magma;
an inlet conduit configured to allow flow of heat transfer fluid from the surface and into the chamber; and an outlet conduit configured to allow flow of heated heat transfer fluid from the chamber toward the surface, wherein the wellbore optionally includes any one or more following limitations:
  a valve configured to open to allow flow of the heated heat transfer fluid through the outlet conduit when a pressure in the chamber is at least a threshold value;
  wherein the outlet conduit comprises an insulation layer;
  wherein the outlet conduit is fluidly coupled to a heat-driven process apparatus, wherein the heat-driven process apparatus comprises one or more of turbines, reaction vessels, condensers, a water distillation system, a heat driven chilling apparatus, a residential heating system, an agriculture system, and an aquaculture system;
  wherein the chamber is in thermal contact with one or both of a wall of the borehole that extends into the underground reservoir of magma and a casing disposed on the wall;
  a thermally conductive layer contacting a wall of the chamber and one or both of the wall of the borehole that extends into the underground reservoir of magma and the casing disposed on the wall;
  wherein the heat transfer fluid comprises one or more of: water, a brine solution, one or more refrigerants, and one or more thermal oils; and/or
  wherein the heat transfer fluid comprises one or more of a molten salt, an ionic liquid, and a nanofluid.

Embodiment 8. A geothermal system comprising:
a wellbore comprising:
  a borehole extending from a surface into an underground reservoir of magma, and
  a chamber located within the borehole and extending at least partially into the underground reservoir of magma; and
a fluid pump configured to provide a flow of heat transfer fluid into the chamber, wherein the geothermal system optionally includes any one or more following limitations:
  wherein the wellbore further comprises:
an inlet conduit configured to allow flow of heat transfer fluid from the surface and into the chamber; and
an outlet conduit configured to allow flow of heated heat transfer fluid from the chamber toward the surface;
  a valve configured to open to allow flow of the heated heat transfer fluid through the outlet conduit when a pressure in the chamber is at least a threshold value;
  wherein the outlet conduit comprises an insulation layer;
  wherein the outlet conduit is fluidly coupled to a heat-driven process apparatus, wherein the heat-driven process apparatus comprises one or more of turbines, reaction vessels, condensers, a water distillation system, a heat driven chilling apparatus, a residential heating system, an agriculture system, and an aquaculture system;
  wherein the chamber is in thermal contact with one or both of a wall of the borehole that extends into the underground reservoir of magma and a casing disposed on the wall;
  a thermally conductive layer contacting a wall of the chamber and one or both of the wall of the borehole that extends into the underground reservoir of magma and the casing disposed on the wall;
  wherein the heat transfer fluid comprises one or more of: water, a brine solution, one or more refrigerants, and one or more thermal oils; and/or
  wherein the heat transfer fluid comprises one or more of a molten salt, an ionic liquid, and a nanofluid.

Embodiment 9. A method for generating power, the method comprising:
  supplying heat transfer fluid to a chamber positioned in a borehole extending at least partially into an underground reservoir of magma;
  receiving heat transfer fluid heated in the chamber;
  providing at least part of a gas-phase portion of the heated heat transfer fluid to at least one turbine;
  operating the at least one turbine with the gas-phase heat transfer fluid to generate electricity; and
  directing at least some condensed heat transfer fluid back to the chamber, wherein the method optionally includes any one or more following limitations:
    holding heat transfer fluid in the chamber until a pressure of the heat transfer fluid reaches at least a threshold value;
    wherein the heat transfer fluid is water and holding the heat transfer fluid in the chamber until the pressure of the heat transfer fluid reaches at least the threshold value comprises holding the water in the chamber until the water becomes steam at least at the threshold pressure; and/or
    wherein the chamber extends at least partially into the underground reservoir of magma.

Embodiment 10. A method of forming a wellbore extending from a surface into an underground reservoir of magma, the method comprising:
  drilling a primary borehole from the surface into the underground reservoir of magma; and
  drilling a secondary borehole extending from the primary borehole and further into the underground reservoir of magma, wherein the method optionally includes any one or more following limitations:
    applying a casing to at least a portion of the primary borehole;
    wherein applying the casing comprises conveying a well casing into the primary borehole while or after advancing a drill bit used to drill the primary borehole towards the underground reservoir;
    wherein drilling the primary borehole comprises drilling in a first direction from the surface to a target depth;
    wherein drilling the secondary borehole comprises drilling further into the underground reservoir at an angle relative to the first direction;
    drilling an additional borehole extending from the secondary borehole;
    drilling a plurality of secondary boreholes extending from the primary borehole, each of the of the plurality of secondary boreholes extending in a different direction into the underground reservoir of magma; and/or
    providing a flow of a cooling fluid into the secondary borehole during or after drilling of the secondary borehole to cause the magma in the underground reservoir to harden and form a wall of the secondary borehole.

Embodiment 11. A wellbore comprising:
a primary borehole with an opening at a surface and an end at a predetermined depth within an underground reservoir of magma; and at least one secondary borehole extending from the primary borehole into the underground reservoir of magma, wherein the wellbore optionally includes any one or more following limitations:
  a casing applied to at least a portion of the primary borehole;
  wherein the at least one secondary borehole extends further into the underground reservoir at an angle relative to a first direction of the primary borehole;
  an additional borehole extending from the at least one secondary borehole;
  a plurality of secondary wellbores extending from the primary wellbore, each of the of the plurality of secondary wellbores extending in a different direction into the underground reservoir of magma; and/or
  wherein the secondary borehole comprises a wall formed of hardened magma.

Embodiment 12. A geothermal system, comprising:
a wellbore comprising:
  a primary borehole with an opening at a surface and an end at a predetermined depth within an underground reservoir of magma; and
  at least one secondary borehole extending from the primary borehole into the underground reservoir of magma; and
a fluid pump configured to provide a flow of heat transfer fluid into the wellbore, wherein the geothermal system optionally includes any one or more following limitations:
  a casing applied to at least a portion of the primary borehole;
  wherein the at least one secondary borehole extends further into the underground reservoir at an angle relative to a first direction of the primary borehole;
  an additional borehole extending from the at least one secondary borehole;
  a plurality of secondary wellbores extending from the primary wellbore, each of the of the plurality of secondary wellbores extending in a different direction into the underground reservoir of magma; and/or
  wherein the at least one secondary borehole comprises a wall formed of hardened magma.

Embodiment 13. A method, comprising:
supplying water into a wellbore comprising:
  a primary borehole with an opening at a surface and an end at a predetermined depth within an underground reservoir of magma; and
  at least one secondary borehole extending from the primary borehole into the underground reservoir of magma;
receiving a flow of steam from the wellbore;
providing at least a portion of the received steam to at least one turbine;
operating the at least one turbine with the steam to generate electricity; and
directing at least some condensate during operation of the at least one turbine back to the wellbore.

Embodiment 14. A method of operating a geothermal system, the method comprising:
providing a molten salt down a wellbore extending from a surface and into an underground reservoir of magma;
receiving heated molten salt from the wellbore; and
providing the heated molten salt to a heat-driven process, wherein the method optionally includes any one or more following limitations:
  returning at least a portion of the molten salt from the heat-driven process back down the wellbore;
  providing the molten salt downward through an annulus formed between a wall of the wellbore and an outer wall of a fluid conduit configured to return the heated molten salt to the surface;
  wherein the fluid conduit comprises a drill stem positioned within the wellbore;
  wherein the wellbore comprises:
a borehole with an opening at the surface and an end at a predetermined depth within the underground reservoir of magma; and
a casing disposed within the borehole and extending from the surface until at least a ceiling of the underground reservoir of magma;
  wherein the casing extends into the underground reservoir of magma;
  wherein the casing extends no more than partially into the underground reservoir of magma, wherein a surface of the borehole within the underground reservoir of magma comprises hardened magma; and/or
  wherein the wellbore comprises:
a primary borehole with an opening at the surface and an end at a predetermined depth within the underground reservoir of magma; and
at least one secondary borehole extending from the primary borehole within the underground reservoir of magma.

Embodiment 15. A wellbore extending into an underground reservoir of magma, the wellbore comprising:
  a borehole with an opening at a surface and an end at a predetermined depth within the underground reservoir of magma; and
  a casing disposed within the borehole and extending from the surface until at least a ceiling of the underground reservoir of magma, wherein the wellbore optionally includes any one or more following limitations:
  wherein the borehole comprises:
a first borehole portion extending from a surface towards the underground reservoir of magma, the first borehole portion comprising a casing extending from a first end at the surface; and
a second borehole portion extending from a terminal end of the first borehole portion to a terminal end of the wellbore, wherein the second borehole portion extends into the underground magma reservoir and a wall of the second borehole portion is hardened magma.
  wherein the wellbore further comprises:
a chamber located within the borehole and extending at least partially into the underground reservoir of magma;
an inlet conduit configured to allow flow of heat transfer fluid from the surface and into the chamber; and
an outlet conduit configured to allow flow of heated heat transfer fluid from the chamber toward the surface;
  a valve configured to open to allow flow of the heated heat transfer fluid through the outlet conduit when a pressure in the chamber is at least a threshold value;
  wherein the outlet conduit comprises an insulation layer; and/or
  wherein the outlet conduit is fluidly coupled to a heat-driven process apparatus, wherein the heat-driven process apparatus comprises one or more of turbines, reaction vessels, condensers, a water distillation system, a heat driven chilling apparatus, a residential heating system, an agriculture system, and an aquaculture system.

Embodiment 16. A geothermal system comprising:
a wellbore comprising:
  a borehole with an opening at a surface and an end at a predetermined depth within an underground reservoir of magma; and
  a casing disposed within the borehole and extending from the surface until at least a ceiling of the underground reservoir of magma; and
a fluid pump configured to provide a flow of molten salt into the wellbore, wherein the geothermal system optionally includes any one or more following limitations:
  wherein the borehole comprises:
  a first borehole portion extending from a surface towards the underground reservoir of magma, the first borehole portion comprising a casing extending from a first end at the surface; and
  a second borehole portion extending from a terminal end of the first borehole portion to a terminal end of the wellbore, wherein the second borehole portion extends into the underground magma reservoir and a wall of the second borehole portion is hardened magma;
  wherein the wellbore further comprises:
  a chamber located within the borehole and extending at least partially into the underground reservoir of magma;
  an inlet conduit configured to allow flow of heat transfer fluid from the surface and into the chamber; and
  an outlet conduit configured to allow flow of heated heat transfer fluid from the chamber toward the surface;
    a valve configured to open to allow flow of the heated heat transfer fluid through the outlet conduit when a pressure in the chamber is at least a threshold value;
    wherein the outlet conduit comprises an insulation layer; and/or
    wherein the outlet conduit is fluidly coupled to a heat-driven process apparatus, wherein the heat-driven process apparatus comprises one or more of turbines, reaction vessels, condensers, a water distillation system, a heat driven chilling apparatus, a residential heating system, an agriculture system, and an aquaculture system.

Although embodiments of the disclosure have been described with reference to several elements, any element described in the embodiments described herein are exemplary and can be omitted, substituted, added, combined, or rearranged as applicable to form new embodiments. A skilled person, upon reading the present specification, would recognize that such additional embodiments are effectively disclosed herein. For example, where this disclosure describes characteristics, structure, size, shape, arrangement, or composition for an element or process for making or using an element or combination of elements, the characteristics, structure, size, shape, arrangement, or composition can also be incorporated into any other element or combination of elements, or process for making or using an element or combination of elements described herein to provide additional embodiments. Moreover, items shown or discussed as coupled or directly coupled or communicating with each other may be indirectly coupled or communicating through some interface device, or intermediate component whether electrically, mechanically, fluidically, or otherwise.

While this disclosure has been particularly shown and described with reference to preferred or example embodiments, it will be understood by those skilled in the art that various changes in form and detail may be made therein without departing from the spirit and scope of the disclosure. Accordingly, this disclosure includes all modifications and equivalents of the subject matter recited in the claims appended hereto as permitted by applicable law. Changes, substitutions and alterations are ascertainable by one skilled in the art and could be made without departing from the spirit and scope disclosed herein. Moreover, any combination of the above-described elements in all possible variations thereof is encompassed by the disclosure unless otherwise indicated herein or otherwise clearly contradicted by context.

Additionally, where an embodiment is described herein as comprising some element or group of elements, additional embodiments can consist essentially of or consist of the element or group of elements. Also, although the open-ended term "comprises" is generally used herein, additional embodiments can be formed by substituting the terms "consisting essentially of" or "consisting of."

What is claimed is:

1. A geothermal system for obtaining heated heat transfer fluid via heat transfer with an underground reservoir of magma, the geothermal system comprising:
   a wellbore extending between a surface and into the underground reservoir of magma;
   a fluid pump configured to provide a flow of heat transfer fluid toward the underground reservoir of magma; and
   a fluid conduit extending from the surface toward a terminal end of the wellbore, the fluid conduit configured to allow flow of heated heat transfer fluid from a portion of the wellbore that extends into the underground reservoir of magma toward the surface, wherein the wellbore includes:
     a borehole with an opening at the surface and an end at a predetermined depth within the underground reservoir of magma,
     a casing disposed within the borehole and extending from the surface and only partially into the underground reservoir of magma,
     a surface of the borehole within the underground reservoir of magma comprises hardened magma.

2. The geothermal system of claim 1, wherein the fluid pump is configured to provide the flow of the heat transfer fluid through an annulus formed between a wall of the wellbore and an outer wall of the fluid conduit.

3. The geothermal system of claim 1, wherein the fluid conduit comprises a drill stem positioned within the wellbore.

4. The geothermal system of claim 1, wherein the casing extends into the underground reservoir of magma.

5. The geothermal system of claim 1, wherein the wellbore comprises:
   a primary borehole with an opening at the surface and an end at a predetermined depth within the underground reservoir of magma; and
   at least one secondary borehole extending from the primary borehole within the underground reservoir of magma.

6. The geothermal system of claim 1, wherein the heat transfer fluid comprises one or more of: water, a brine solution, one or more refrigerants, and one or more thermal oils.

7. The geothermal system of claim 1, wherein the heat transfer fluid comprises one or more of a molten salt, an ionic liquid, and a nanofluid.

8. The geothermal system of claim 1, wherein the fluid conduit is further coupled to a heat-driven process apparatus, wherein the heat-driven process apparatus comprises one or more of turbines, reaction vessels, condensers, a water distillation system, a heat driven chilling apparatus, a residential heating system, an agriculture system, and an aquaculture system.

9. The geothermal system of claim 8, wherein at least a portion of the heat transfer fluid from heat-driven process apparatus is returned to the wellbore.

10. The geothermal system of claim 1, wherein the fluid conduit comprises an insulation layer.

11. A method of operating a geothermal system, the method comprising:
providing a heat transfer fluid down a wellbore extending from a surface and into an underground reservoir of magma, wherein the wellbore includes:
    a borehole with an opening at the surface and an end at a predetermined depth within the underground reservoir of magma,
    a casing disposed within the borehole and extending from the surface and only partially into the underground reservoir of magma,
    a surface of the borehole within the underground reservoir of magma comprises hardened magma;
receiving heated heat transfer fluid from the wellbore; and
providing the heated heat transfer fluid to a heat-driven process.

12. The method of claim 11, further comprising returning at least a portion of the heat transfer fluid from the heat-driven process back down the wellbore.

13. The method of claim 11, wherein:
the heat transfer fluid provided down the wellbore comprises liquid water and the heated heat transfer fluid received from the wellbore comprises steam; and
providing the heated heat transfer fluid to the heat-driven process comprises:
    providing at least a portion of the steam to at least one turbine; and
    operating the at least one turbine with the steam to generate electricity.

14. A geothermal system, comprising:
a fluid pump configured to provide a flow of heat transfer fluid through a wellbore from a surface and toward an underground reservoir of magma, wherein the wellbore includes:
    a borehole with an opening at the surface and an end at a predetermined depth within the underground reservoir of magma,
    a casing disposed within the borehole and extending from the surface and only partially into the underground reservoir of magma,
    a surface of the borehole within the underground reservoir of magma comprises hardened magma; and
a fluid conduit extending from the surface toward a terminal end of the wellbore located within a portion of the wellbore that extends into the underground reservoir of magma, the fluid conduit configured to allow flow of heated heat transfer fluid from the portion of the wellbore that extends into the underground reservoir of magma toward the surface.

15. The geothermal system of claim 14, wherein the fluid pump is configured to provide the flow of the heat transfer fluid through an annulus formed between a wall of the wellbore and an outer wall of the fluid conduit.

16. The geothermal system of claim 14, wherein the fluid conduit comprises a drill stem positioned within the wellbore.

17. The geothermal system of claim 14, wherein the heat transfer fluid comprises one or more of: water, a brine solution, one or more refrigerants, one or more thermal oils, a molten salt, an ionic liquid, and a nanofluid.

18. The geothermal system of claim 14, wherein the fluid conduit comprises an insulation layer.

\* \* \* \* \*